United States Patent [19]
Lamine et al.

[11] Patent Number: 5,720,355
[45] Date of Patent: *Feb. 24, 1998

[54] DRILL BIT INSTRUMENTATION AND METHOD FOR CONTROLLING DRILLING OR CORE-DRILLING

[75] Inventors: Etienne Lamine, Brussels; Pierre Stassain, Liege, both of Belgium; Kees Langeveld, Rijswijk, Netherlands; Michael Bittar, Houston; Paul F. Rodney, Spring, both of Tex.

[73] Assignee: Baroid Technology, Inc., Houston, Tex.

[*] Notice: The term of this patent shall not extend beyond the expiration date of Pat. No. 5,501,285.

[21] Appl. No.: 548,225

[22] Filed: Oct. 25, 1995

Related U.S. Application Data

[63] Continuation-in-part of Ser. No. 276,137, Jul. 18, 1994.

[30] Foreign Application Priority Data

Jul. 20, 1993 [BE] Belgium ........................... 09300768

[51] Int. Cl.⁶ ........................................... E21B 47/00
[52] U.S. Cl. ................................. 175/27; 175/45
[58] Field of Search ........................... 175/27, 40, 41, 175/45, 50

[56] References Cited

U.S. PATENT DOCUMENTS

| | | |
|---|---|---|
| 4,372,398 | 2/1983 | Kuckes . |
| 4,562,560 | 12/1985 | Kamp . |
| 4,570,480 | 2/1986 | Fontenot et al. . |
| 4,739,841 | 4/1988 | Das . |
| 4,786,874 | 11/1988 | Grosso et al. . |
| 4,905,774 | 3/1990 | Wittrisch . |
| 4,907,658 | 3/1990 | Stangl et al. . |
| 4,933,640 | 6/1990 | Kuckes . |
| 5,064,006 | 11/1991 | Waters et al. . |
| 5,163,521 | 11/1992 | Pustanyk et al. . |
| 5,220,963 | 6/1993 | Patton . |
| 5,230,386 | 7/1993 | Wu et al. . |
| 5,251,708 | 10/1993 | Peny et al. ........................ 175/41 |
| 5,501,285 | 3/1996 | Lamine et al. ...................... 175/27 |

OTHER PUBLICATIONS

Bit Whirl Identification by Experiment, S.L. Chen & M. Geradin LTAS, University of Liege, Mar. 1993.
Whirl and Chaotic Motion of Stabilized Drill Collars, J.D. Jansen, SPE, Koninklijke/Shell E&P Laboratorium, 1992.
Bit Whirl: A New Theory of PDC Bit Failure, J.F. Brett, T.M. Warren, and Amoco Production Co., SPE 19571.
Case Studies of the Bending Vibration and Whirling Motion of Drill Collars, J.K. Vandiver, J.W. Nicholson, Shell Development Co., & R.J. Shyu.

*Primary Examiner*—William P. Neuder
*Attorney, Agent, or Firm*—Browning Bushman

[57] ABSTRACT

Bit instrumentation and method for controlling drilling are disclosed that include multiple resistivity sensors 5B and accelerometer sensors 4 disposed within an insert portion 1B of the drill bit 1. The resistivity sensors have a beveled portion to provide an interference fit with a cavity formed within the insert portion 1B of the drill bit. Resistivity sensors 5B may be used to determine the motion of the bit 1 within the wellbore 106 including unstable bit operation such as bit whirling and bit tilting. As well, accelerometer sensors 4 may also be provided in conjunction with the resistivity sensors 5B to provide information concerning motion, accelerations and stresses applied to or within the drill bit 1.

80 Claims, 17 Drawing Sheets

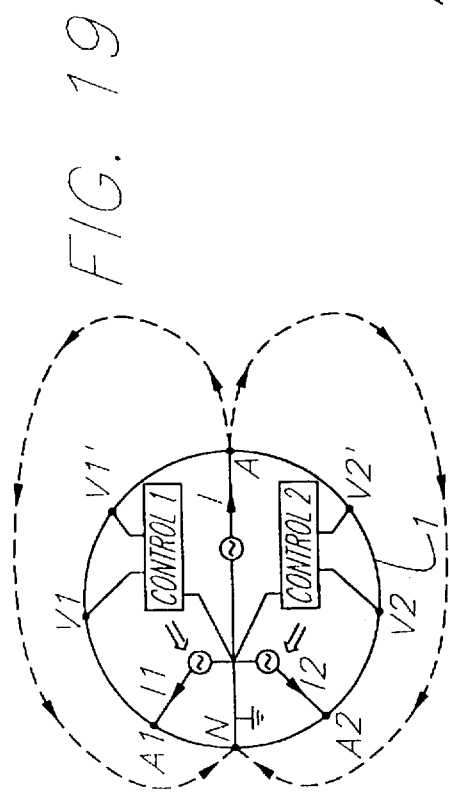
FIG. 19
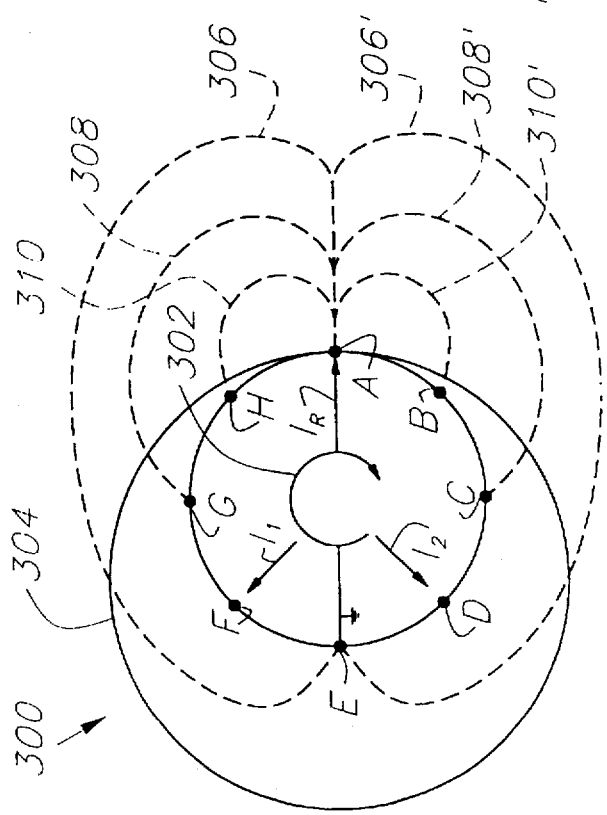
FIG. 20
FIG. 19A

DRILL BIT INSTRUMENTATION AND METHOD FOR CONTROLLING DRILLING OR CORE-DRILLING

This application is a continuation-in-part of U.S. application Ser. No. 08/276,137 filed Jul. 18, 1994, which is based on priority of Belgium Patent No. 09300768 filed Jul. 20, 1993.

BACKGROUND OF THE INVENTION

1. Field of the Invention

The present invention relates generally to drill bit instrumentation and, more particularly, to apparatus and methods for providing drill bit instrumentation to thereby obtain improved control of the drilling operation.

2. Description of the Background

In order to improve drilling and core-drilling operations, it is necessary to gather as much information as possible on the parameters of the environment in which drilling takes place. Such parameters include the behavior of the drill bit or core head during drilling as well as the type of formation encountered. For instance, it is highly desirable to ascertain fluctuations in the motion of the drill bit such as "bit whirling." It is also desirable to detect variations in the downhole composition of drilling fluid such as changes in salinity, presence of oil, and other parameters as discussed hereinafter.

While the prior art offers various devices that may be used to measure such parameters at certain positions in the drill string, the prior art does not provide a suitable method or instrumentation to implement sensors in the drill bit itself where the information would often be the most highly pertinent and useful. It is thus desirable to provide parameters from the bit itself related to the drilling operation that disclose variations in speed of rotation, rate of penetration, shocks felt by the bit, the path of motion of the bit, and so forth.

Such information could be used to determine bit stability, bit wear, and to control drilling in a manner to optimize bit performance in varying formations to thereby significantly reduce drilling costs and decrease drilling time. Detection of "whirling" of the bit, or other drill string instabilities, could be used to control or eliminate such instabilities to thereby greatly extend the life of the bit and other drill string components thereby resulting in large cost savings.

As well as substantially controlling instability of downhole equipment during the drilling operation in accord with the apparatus and methods of the present invention, the manufacturing cost of otherwise providing for stabilization and/or strengthening of such elements (i.e., specially reinforced drill bit cutters) may also be reduced.

Information from the drill bit would be valuable for controlling the drill string in a manner that allows the well to be drilled to the target region along the optimum projected path for the wellbore. For instance, such information could be valuable to quickly determine unstable bit conditions conducive to such undesired bit action as "walking" of the bit away from a desired drilling path, and allow for immediate correction. If such information becomes known through devices located above the drill bit, then the wellbore may already have an undesired bend or "dogleg" produced therein by the time the information is finally available. A "dogleg" in the wellbore exacerbates the difficulty, and therefore the cost, of drilling the well.

Additionally, the availability of resistivity at the bit allows for immediate correlation of the position of the bit within the reservoir. It has long been known to determine the position of the wellbore within a reservoir by correlating the resistivity or other information from offset well logs or seismic data. Such information provides means to make more informed decisions as to drilling procedures and corrections of drilling paths due to, for example, unanticipated variations in downhole structures.

Various controls are available to regulate the drilling operation from the surface that are well known to those skilled in the art. A non-exhaustive list of such controls may include temporarily lifting the drill string, changing the weight on the bit, altering the rotational speed of the bit, re-orienting a bent sub within the drill string, altering the torque applied to the drill string, varying the mud pump speed, altering drilling fluid composition, adjusting movable stabilizers or other operable drill string components, selecting or changing drill string components and their placement, projecting or altering a desired drilling path towards or through a predetermined target region, and the like.

Various problems have hindered the highly desirable use of such sensors in the bit. Such problems include, but are not necessarily limited to, sensor mounting stresses and electrical interconnection problems between the bit and the drill string. These problems are greatly exacerbated when it is desired to obtain multiple sensor data from the drill bit itself. As well, because the bit is generally expendable, the cost of providing such instrumentation is very high if the instrumentation is used only for a short time before being discarded.

Consequently, there remains a need for a drill bit instrumentation that offers dependable operation and reliable information highly relevant to controlling the drilling operation. Those skilled in the art have long sought and will appreciate the present invention which provides solutions to these and other problems.

SUMMARY OF THE INVENTION

The present invention provides instrumentation for a drill bit for measuring at least one physical parameter of the drill bit environment. According to one embodiment of the present invention, the physical parameters may be transmitted to the surface while they are being collected, as with a mud pulse transmitter or other means, to enable direct control of the drilling device during the drilling operation. Such feedback allows increased optimization or control of the drilling operation.

The measured parameters may also be stored downhole during the drilling operation and used subsequently to analyze problems that occurred during the drilling operation. The parameters may be retrieved and used to determine solutions to drilling or core-drilling operations that are likely to be carried out under conditions similar to those experienced during the drilling operation that gave rise to these parameters. Such problems might include reduced bit penetration into the formations encountered or rapid bit wear.

For the present invention, the drill bit is secured to the end of a drill string and is operable for drilling a borehole through a formation. The drill string and the borehole form a fluid flow path for circulating fluid through the drill string and the borehole. The apparatus comprises a bit body for the drill bit. The bit body has a bit body fluid bore extending therethrough for the fluid flow path. A cutter element, which may include fixed cutting elements, roller cones, and the like, is mounted to the bit body for cutting into the formation to form the borehole. A first sensor is affixed to the bit body, the first sensor is responsive for producing an electrical signal related to the at least one physical parameter. An electrical conductor is connected to the first sensor for electrically conducting the electrical signal to a data collection system.

The first sensor preferably includes a beveled portion that mates to a correspondingly beveled inner portion of a first insulator which may be formed of a sturdy insulating material such as zirconia. The sensor mounting further preferably includes a beveled or frustoconical surface and a mating frustoconical outer portion of said first insulator. The bit is mounted by a plurality of fasteners to a cylindrical bit instrumentation section that may be threadably secured to the drill string.

The first sensor may be of several types. For instance, an electrical parameter sensor may be provided that is operable for measuring an electrical parameter such as resistivity of the drilling fluid. The first sensor could also be an electrical parameter sensor, accelerometer sensor, or related sensor for measuring a parameter related to movement of the bit body. The electrical parameter sensors may be focussed so as to read or be sensitive radially outwardly at a desired distance from the bit body.

The method of operation includes measuring at least one physical parameter in the locus of the drill bit. A signal is produced in response to detecting the physical parameter. The signal is conducted through a cable connecting to a data collection system. The resistance between the sensor and another part of said drill bit is detected and may be used to determine the resistivity of the drilling fluid. The formation resistivity may also be determined from the measured resistance and/or measurements of drilling fluid resistivity at the bit.

The instantaneous rotational speed of the drill bit and variations thereof may be determined, as discussed hereinafter, from the measured resistance. Indications of bit instability such as bit whirling that may prematurely wear the bit or cause walking of the bit off the desired course may also be determined from the measured resistance or resistivity. The measured resistance may also be used to determine bit position within the borehole and may thereby also indicate "walking" of the bit as when the bit is positioned consistently on a side of the borehole that is different than would be anticipated from the drilling direction of the borehole.

As well, one or more accelerometers may be used to detect acceleration of said drill bit in various directions. The approximate diameter of the borehole is determined from the detected acceleration. The motion of the drill bit, including its path of movement in the borehole, is determined from the detected acceleration.

It is an object of the present invention to provide an improved bit instrumentation assembly and method for use thereof.

It is another object of the present invention to provide a bit instrumentation assembly operable for measuring a resistance/resistivity of drilling fluid/formation at the bit and for effecting a drilling control based on the measured resistance/resistivity value. A feature of the present invention is an electrode insulated from a surface portion of the bit.

Another feature of the present invention is a plurality of electrodes, each insulated from the surface of the bit.

Yet another feature of the present invention is a tri-axial accelerometer disposed on a radius of the bit to determine acceleration along the radius, transverse to the bit, and along a line parallel to the axis of the bit.

Yet another feature of the present invention is one or more focusing electrodes for radially extending the sensitivity of electrical parameter sensors radially outwardly from the bit.

An advantage of the present invention is improved control over the drilling operation due to information received from sensors mounted on the bit itself.

Another advantage of the present invention is the ability to combine resistivity and acceleration information that allows optimizing control by adapting the speed and weight on the bit to the prevailing circumstances.

Another advantage of the present invention is the ability to measure electric resistance between at least two conductive locations on the bit that are electrically insulated with respect to each other.

These and other objects, features, and advantages of the present invention will become apparent from the drawings, the descriptions given herein, and the appended claims.

BRIEF DESCRIPTION OF THE DRAWINGS

FIG. 19 is a schematic, from a top view, of a focussed electrode configuration for a bit instrumentation showing current flow paths through the bit environment:

FIG. 19A is a schematic, from a top view, of an electronically rotating electrode configuration for a bit instrumentation which may be similar to that of FIG. 19 showing current flow paths through the bit environment at one switch position;

FIG. 20 is a schematic, from a top view, of an electrode configuration modified from that of FIG. 19;

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 1:
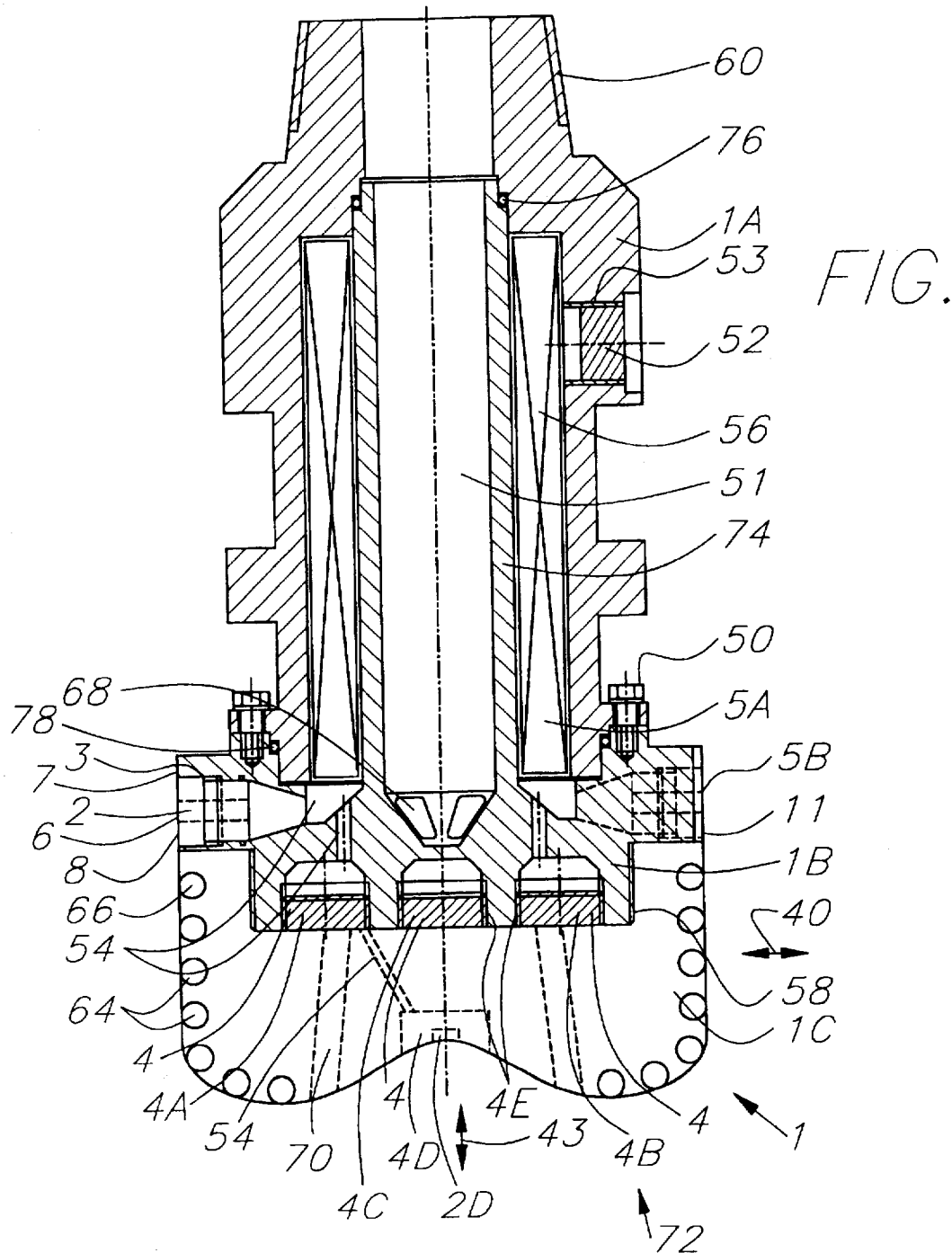
FIG. 1 is an elevational view, partially in section, of a bit instrumentation in accord with the present invention.

Referring now to the drawings, and more particularly to FIG. 1, an apparatus in accord with the present invention is illustrated that includes drill bit 1 and associated instrumentation. Drill bit 1 is meant to include the various standard and non-standard drill bits as well as core bits, core heads, and other drilling devices for use with a drill string. Such drill bits may be used in drilling and workover operations, as may be required in industries such as the petroleum industry. The method of the present invention involves the steps of measuring the electrical resistance of the drilling environment and/or acceleration of the bit, and adjusting drilling controls according to the measured values.

As shown in FIG. 1, a tubular hollow body shank portion 1A defines annular housing 56 for data collection circuits 5A, discussed in detail hereinafter, which preferably includes the various instrument components such as power supply 25, data collection system 32, transmission system 34, and other elements of the instrumentation except for sensor 4 and 5B. Shank portion 1A is arranged to be fixed along rods (not illustrated). Shank 1A is preferably affixed by a plurality of fasteners, such as screws 50, to insert portion 1B of bit 1. The plurality of fasteners are circumferentially disposed around pipe body 74 through which fluid path 51 through the bit is provided. Pipe 74 is secured to insert portion 1B and is preferably integral therewith as shown in FIG. 1 although it could also be threadably secured thereto. Pipe body 74 preferably defines therein drilling fluid flow path 51 through shank portion 1A. Pipe 74 is sealed with upper seal 76 and lower seal 78 where shank portion 1A is secured to insert portion 1B. Pipe body 74 extends into the tubular shank 1A and thereby defines an inner sealed wall for data collection circuitry 5A.

Resistance or contact sensors 5B are preferably arranged in annularly directed sockets 3 within a insert 1B so as to be disposed radially inwardly or flush with outer surface 11 of bit 1 within insert portion 1B. The outer measuring surface 6 of electrodes 2 are preferably at bit gauge. Accelerometers 4 are threadably secured within threaded housing portions of insert portion 1B with threads 4E. Passageways 54 for connection leads extend from insert portion 1B to shank 1A housing 56.

Threads 58 are preferably provided to secure insert portion 1B to cutting edge section 1C. Other means, such as a plurality of bolts, welding, or other securing means could also be used to secure these portions together. Threads 58 preferably extend into cutting edge section 1C at least partially below at least some of cutters 64 and top cutter 66. Insert portion 1B and cutting edge section 1C form the bit body 1BC (both insert 1B and cutter section 1C). Bit body 1BC is secured by a plurality of fasteners 50 to shank portion 1A. Due to the absence of a single threaded connection between bit body 1BC and shank portion 1A whereby the shank portion must be rotated with respect to bit body 1BC, the electrical connectors between sensors 5B and instrumentation 5A may easily be threaded through passageways 54.

Shank 1A and insert 1B are thus fixably oriented with each other during manufacture to avoid the need for electrical connectors that must rotate and make contact. No electrical connector is needed at all, in fact, between shank 1A and insert 1B. Otherwise, the electrical interconnections would be quite difficult to make. Due to space requirements, it is preferable not to have the entire instrumentation within bit body 1BC. The lack of rotation between shank 1A and insert 1B also allows for reliable sealing of passageways 54.

Shank portion 1A terminates on its upper side opposite cutter face 72 with pipe threads 60, that generally surround fluid flow path 51 through section 1A. Pipe threads 60 are preferably of the pin type to threadably secure bit 1 to the end of the drill string which may typically conclude with box type threads. Pin pipe threads 60 may be of a conical thread configuration for drill pipe.

Because portions of the bit are detachable with respect to each other, the typically expendable cutters on cutting edge section 1C may be discarded or reworked without affecting sensors in insert portion 1B. For this purpose, cutting edge section 1C preferably has a substantially C-shaped cross-section for threadably receiving insert portion 1B. Thus, cutting edge section 1C preferably has a bowl shape that includes box threads 58 for attachment with insert portion 1B. Threads 58 are preferably positioned at least partially above top cutter 66 with respect to the drill bit orientation of FIG. 1. Bolts could also be used to fasten cutting edge section 1C to insert 1B or shank portion 1A, and would be desirable if sensors are positioned therein to provide better alignment of cable passageways. In the presently preferred embodiment, all sensors are positioned within the flange shaped portion 11 of insert 1B.

Flow paths 68 and 70 are provided through insert portion 1B and cutting edge section 1C, respectively, and are directed to allow drilling fluid flow to cutting face 72. From single flow path 51, multiple flow paths 68 and 70 are provided to avoid restriction of fluid flow through drill bit 1. Preferably, drilling fluid flow paths around insert portion 1B are provided by circumferential recesses or grooves 62 (See, for instance, FIG. 4). The recesses or grooves may be insulated (i.e., with resin coating) if desired to reduce electric current flow paths on the bit.

Watertight joints are provided so that the drilling fluid is restricted to the fluid path through pipe 51 towards cutting edge 1C and cannot get into annular spaces provided for instrumentation 5 or accelerometer locations 4. A threadable stop plug 52 secures to a threaded port in shank 1A to provide access to instrumentation 5A. For example, plug 52 may be removed to quickly obtain access for calibration, charging batteries, collecting measurement samples, etc.

The resistance measured depends on the resistivity (in ohm-meters) of the environment where the measurement is carried out. Such an environment includes the formation surrounding the bit, the drilling fluid, and any influence of the drill bit itself which may be substantially electrically conductive.

Although there are many variations, typical drilling fluids used in many drilling or core-drilling operations for the oil industry have a resistivity between about 0.05 and 1 ohm-meters. In an oil-based drilling fluid, the resistivity may be substantially infinite. A substantially infinite resistivity may also be measured with non oil-based drilling fluids if the measurement of the drilling fluid resistivity is carried out in proximity with a rock formation that contains oil such that the drilling fluid is mixed with oil.

Resistivity measurements of formations typically encountered in drilling operations often give rise to a range of resistivities from about 0.1 to 20 or more ohm-meters. Formation resistivity is typically higher in oil production zones and is related to the percentage of hydrocarbon saturation of the formation fluid, the porosity of the formation, and other such factors as are known to those skilled in the art.

Figure 3:
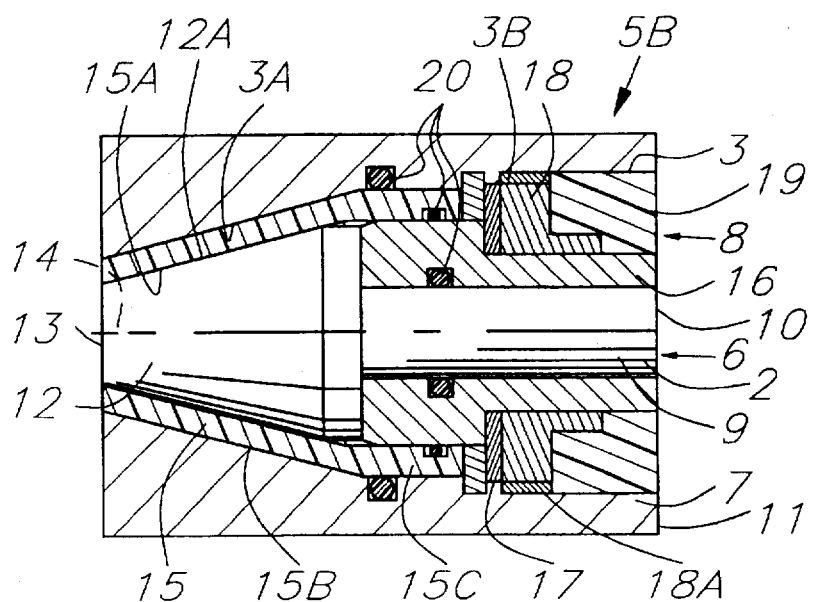
FIG. 3 is an enlarged elevational view of a contact electrode in accord with the present invention.
Figure 4:
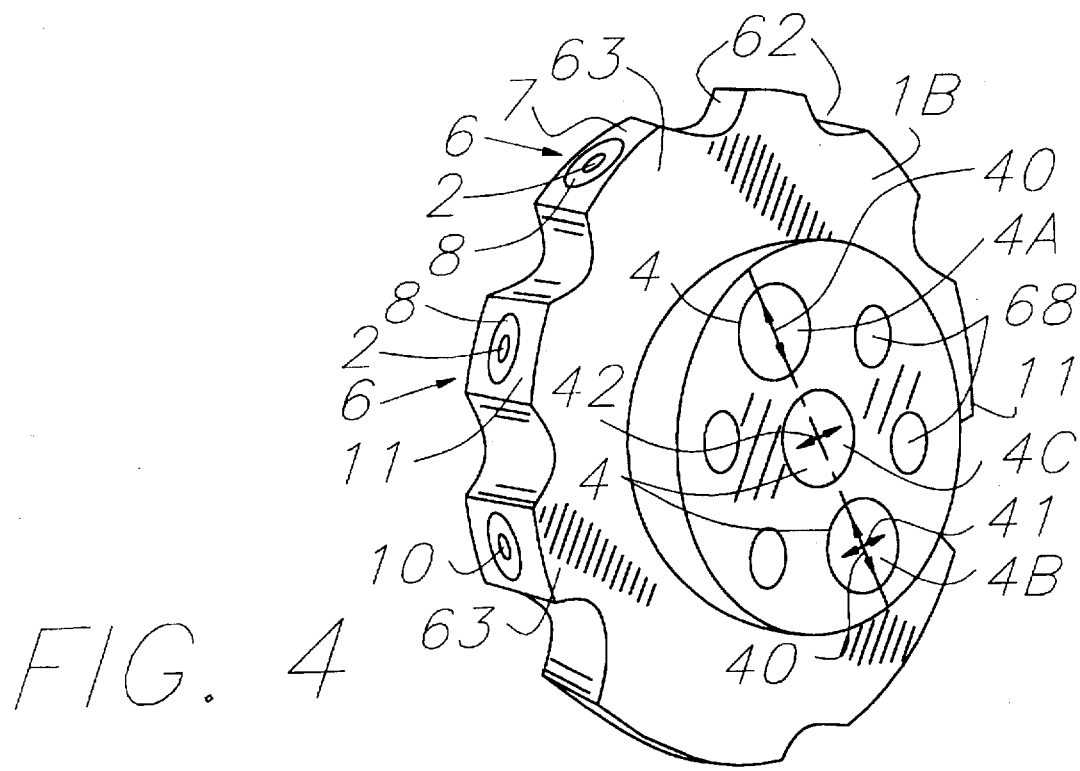
FIG. 4 is a perspective view of a portion of a bit body adapted to accommodate a plurality electrodes and three accelerometers.

FIGS. 1, 3, and 4 disclose construction of a preferred embodiment resistivity sensor 5B. Sensor 5B may be used to provide a resistivity measurement at drill bit 1. Sensor 5B measures a resistance R between electrode 2 and a current return that may either be a conductive surface region of drill bit 1 such as current return 7 or another electrode 2 in another sensor 5B.

Figure 2:
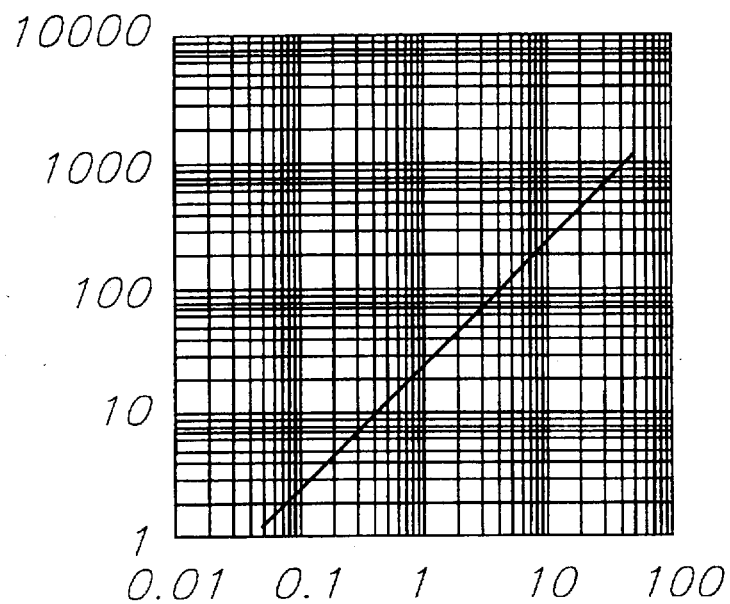
FIG. 2 is a graph illustrating the relationship between the measured resistance and the resistivity of the medium surrounding the drill bit that may include drilling fluid and/or rock formation using a circular electrode having a 5 mm radius.

It has been determined by mathematical modelling, and confirmed by experimentation, that the relationship between the measured resistance R and the resistivity ρ of the environment in which the measurement is taken may be expressed to a good approximation by the following equation:

$$R=\rho/(8a)$$

where a is the radius of electrode 2. FIG. 2 illustrates a logarithmic graph of the curve corresponding to this equation, if a=5 mm (0.005 meters), with R being expressed in ohms and ρ being expressed in ohm-meters. While resistance and resistivities are referred to herein without discussing reactances, it will be understood throughout the specification that more precisely all measurements are likely to include reactances unless special precautions are used such as selected measurement frequencies so that the absolute value of the impedance Z is typically measured rather than R such that:

$$Z=R+jX$$

Electrode 2 is insulated from the surface of bit 1 and preferably has a circular end face 10 with a very high electrical conductivity. The environment that circular end face 10 encounters will normally be comprised of drilling fluid, formation fluid, and rock formation.

A more precise relationship may be determined from finite element analysis and further experimentation with the desired bit configuration.

Measurement samples of resistance can be transmitted to the operators of the drilling device so that the operators can monitor and adjust the various controls for the drilling device according to its motion within the environment encountered. The measurement of resistance can also be recorded downhole for subsequent use in similar drilling environments i.e. wells drilled in a single field.

The measurement of resistance R from the above equation may be carried out by electrode 2, e.g., an electrode fitted to drilling bit 1 so that it is electrically insulated from it and from the rest of the drilling string. Current return 7, which may include the metallic mass of drill bit 1, can be used in conjunction with electrode 2 for this purpose. For the purpose of forming a suitable current return 7, the metal surfaces surrounding electrode 2 at the desired location of current return 7 should preferably be free from any sort of insulation that would present electrical resistance.

Figure 5:
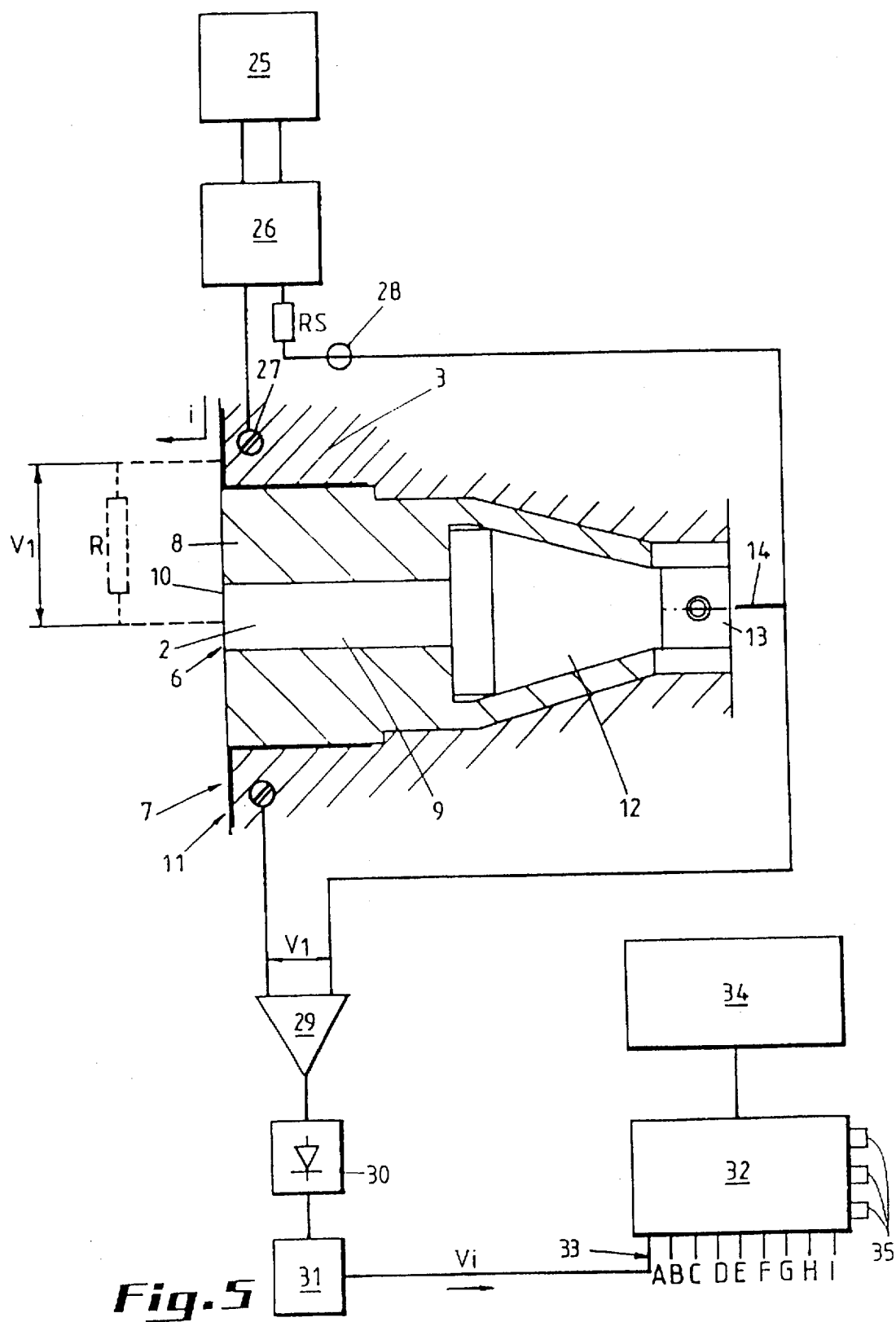
FIG. 5 is a functional diagram of instrumentation for the measurement and transmission of the resistance and acceleration in accord with the present invention.

A representative circuit shown in FIG. 5, measures R in the above equation between current return 7 and electrode 2. In the same way, the measurement of resistance R could be carried out between two electrodes 2 within respective sensors 5B or other electrodes in other types of sensors discussed hereinafter. Furthermore, one or both electrodes 2 may be electrically insulated from drill bit 1 as desired. It may also be desirable that some external metal surfaces of drill bit 1 located between the measurement positions be covered with an electrical insulator to avoid or reduce interference from the metallic mass of drill bit 1.

Generally, the depth of investigation of the device will increase as the width of insulation between the measuring electrode and current return increases. The insulation may be superficial insulation that covers an outer metallic portion of drill bit 1 and could comprise a relatively thin coating or could also be positioned within grooves or recesses, such as recesses 62 (see FIG. 4), that would not normally contact the formation to increase the depth of investigation.

The resistance measurement instrumentation for carrying out the method according to one embodiment of the invention includes data collection system 5A and at least one sensor 5B. Within sensor 5B, electrode 2 is electrically insulated from the apparatus by an insulator 8. Insulator 8 should preferably be formed of rugged insulting materials such as zirconia, resins, and the like as discussed further hereinafter.

According to the embodiment of the invention shown in FIG. 3, electrode 2 comprises a cylindrical segment 9 whose longitudinal axis is preferably arranged in the bit 1 along a radius of bit 1 (i.e., orthogonal to bit axis 43). Outwardly facing end face 10 is preferably perpendicular to the radius and preferably substantially flush or level with circumference 11 of bit 1 so as to constitute measurement location 6. End face 10 may also be rounded with the circumference of the bit if desired. The positioning in this manner provides that the resistivity reading will correspond to a radial offset distance of bit 1 from the borehole wall when there is an offset between bit 1 and the borehole wall.

Opposite end face 10, cylindrical segment 9 includes an enlarged diameter segment 12 having a beveled, tapered, conical, or frustoconical surface 12A that is preferably co-axial and symmetrical with respect to cylindrical segment 9. At end 13, connection lead 14 may be brazed or otherwise secured and may preferably extend into an elongate aperture within segment 12 for this purpose. Additional support material (not shown) may be used to support lead 14 as necessary to prevent bending or vibrational stresses.

According to FIG. 3, insulator 8, made of standard rugged insulating material or materials, can include an insulating sleeve 15. Insulating sleeve 15 preferably has inner and outer beveled, tapered, conical, and/or frustoconical surfaces 15A and 15B. Surface 15A preferably mates to the surface of 12A with a press or interference fit. Likewise surface 15B preferably mates to surface 3A of cavity 3 that is located, in a preferred embodiment, within removable bit insert 1B. A cylindrical portion 15C of insulating sleeve 15 defines a receptacle for a layered socket member 16 that supports washer 17 (of the Belleville type).

Washer 17 compresses the corresponding tapered surfaces in response to pressure by layered ring 18 with external threads 18A that mate to threads 3B within bit 1. The screwing of ring 18 into bit 1 ensures the precise positioning of electrode 2, at a radial distance from the bit axis that is preferably flush or level with external circumferential surface 11 of bit 1 that may typically be at bit gauge. However, if desired for some purpose, surface 10 and 11 could be offset from bit gauge.

Three O-rings 20 are preferably used between these components to provide a suitable sea/to prevent any penetration of drilling fluid along electrode 2 or insulator 8. Additional sealing for the housing of electrode 2, preferably flush or level with external circumference 11, can be achieved by means of a resin 19 that may be poured over insulator 8 and then allowed to cure.

End face 10 of electrode 2, that is free from any insulating material, defines the extent of the measuring location 6. In this case, metallic material of current return 7, or more generally the measuring position 7, surrounds the resin. Measuring position 7 is also preferably free of insulating material so as to be electrically in contact with the environment to be measured where drilling is taking place.

The positioning of end face 10 to be flush with the outer peripheral surface 11 of bit 1 (which could also be surface 100 of the cannon fuse electrode) provides a simultaneous contact of end face 10 and peripheral surface 11 of insert 1B with the drilling fluid and/or the formations where the drilling is carried out.

For the measurement of resistance R (FIG. 5), the measuring device 5 (comprised of sensor 5B and collection system 5A) preferably includes power source 25, such as batteries, to deliver a continuous or constant current to current converter 26 that generate for the measurement an alternating current i at its output terminals 27, 28, so as to preferably avoid polarizing the measuring locations 6 and 7. Power source 25 could also be a generator that is activated by flow of drilling fluid. The alternating current i may preferably have a square wave shape and a suitably high frequency that is well above the sampling rate so as not to be affected by the speed of rotation of drill bit 1. A frequency in the range from about 500 to 10 KHz should be adequate for most purposes with a frequency of about from 1 KHz to 4 KHz being the presently preferred range of frequency.

Cabling is used to connect constant current i to output terminals 27 of current return 7, and output terminal 28 to electrode 2. Output terminals 27 and 28 are also connected to the input of differential amplifier 29 whose output is serially connected to rectifier 30 and filter 31. The constant current i will produce a voltage $V_1$ that varies as R varies. $V_1$ is the output of filter 31 and will also be indicative of R. The output $V_1$ is connected to input terminal 33A of data collection system 32 comprising a microprocessor, and analog/digital converter, a memory and a module adapted for coding data before transmission. Other inputs 33B–33I preferably connect to additional sensors typically located within insert section 1B of bit 1 as shown, for instance, in FIG. 4. The data can be stored in the system memory for subsequent retrieval or be sent to transmission device 34. Inputs 35 may be used for accelerometers 4 as discussed hereinafter.

The transmission device 34 can be adapted to transmit measurements as soon as they are taken or can be adapted to store measurements therein and transmit them only later, for example, after withdrawal of drill bit 1 from the wellbore. Transmission may be to the surface through a mud sender unit known to those skilled in the art. Alternatively, a local receiver may be provided. For instance, a first short hop transmission from rotating bit 1 may be provided, as by an antenna, to a receiver mounted in the mud motor housing, as discussed hereinafter.

The data delivered by the electrodes 2 and/or by the accelerometers 4 or other sensors can be processed locally by the microprocessor. Local processing of the data avoids the need for storage and/or transmission of all the signals that are recorded at great speed, some of which may have no further use after processing.

Figure 6:
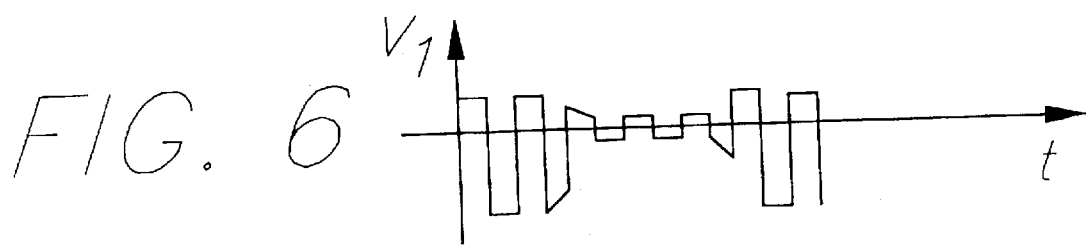
FIG. 6 is a graph of voltage measured as a function of time between an electrode and the metal mass of the drill bit with the drilling bit being in contact with the drilling fluid, for a given alternating current.
Figure 7:
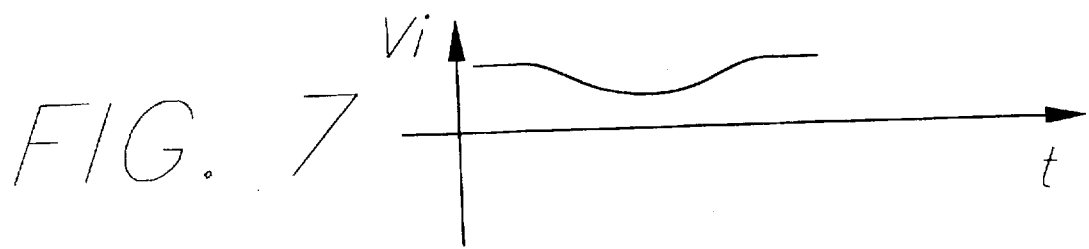
FIG. 7 is a graph corresponding to FIG. 6 and illustrating the above-described voltage after treatment by a differential amplifier, a rectifying device and a filter.
Figure 8:
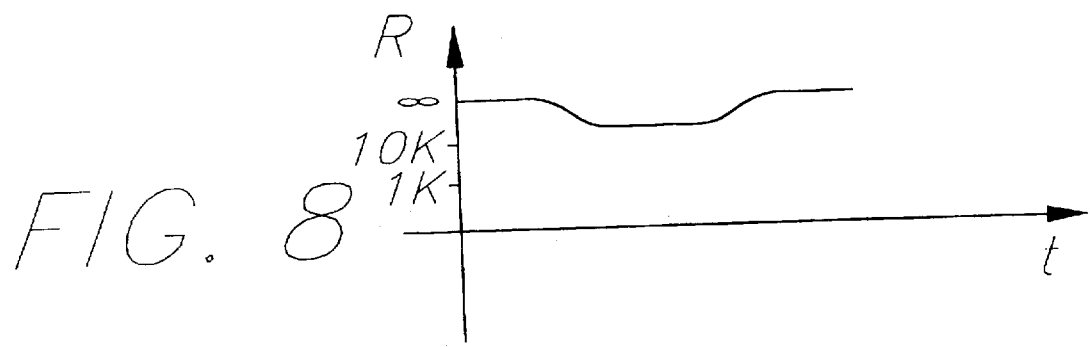
FIG. 8 is a graph corresponding to the two preceding graphs and simultaneously representing the measured resistance.

The current i flowing through electrode 2 and current return 7 through electric resistance R creates potential difference $V_1$ between current return 7 and electrode 2 as shown in FIG. 6. Resistance R includes resistance in the locus of drill bit 1 such as drilling fluid, formation, and drill bit 1 itself. $V_1$ could also be measured, for instance, between two electrodes 2, that may be circumferentially spaced from each other. Potential difference $V_1$, is used by differential amplifier 29 to generate a voltage which, after processing by rectifier 30 and filter 31, delivers voltage $V_1$ (FIG. 7) that is proportional to the measured resistance R (FIG. 8). It will be noted that resistance R will be almost infinite when there is no contact by the measurement locations 2, 7 with a conductive environment. This fact may be used for sensor calibration purposes, circuit checks, and the like.

Multiple signals may be received from several similar sensors 5B (see FIGS. 4 and 13, for example) that are vertically or circumferentially spaced or distributed around drill bit 1. Multiple measurements or samples of voltage V can be recorded with respect to time, or with respect to other factors such as drill string rotation position, bit position or acceleration, and the like. Several different embodiments of electrode configurations that may produce multiple measurements are shown in FIGS. 4, 13, 14, and 19–24.

FIG. 4 provides an electrode configuration wherein several electrodes 2 are preferably distributed around the circumference of drill bit 1, at the bit gauge of bit insert 1B, or at least preferably at the same radial distance from bit axis 43. The longitudinal axes of each of the electrodes 2 preferably lie substantially in the same plane, which plane is perpendicular to bit axis 43 of bit 1.

FIG. 4 discloses a preferred embodiment removable insert 1B that is shown installed between shank 1A and cutter 1C in FIG. 1. While cutting section 1C may be discardable or repairable after drilling, insert 1B and the sensors therein are reusable along with shank 1A. Thus, insert 1B may be used with a new or repaired cutting section 1C if desired. Insert 1B and shank 1A may also be disconnected or substituted with respect to each other as desired.

Figure 9:
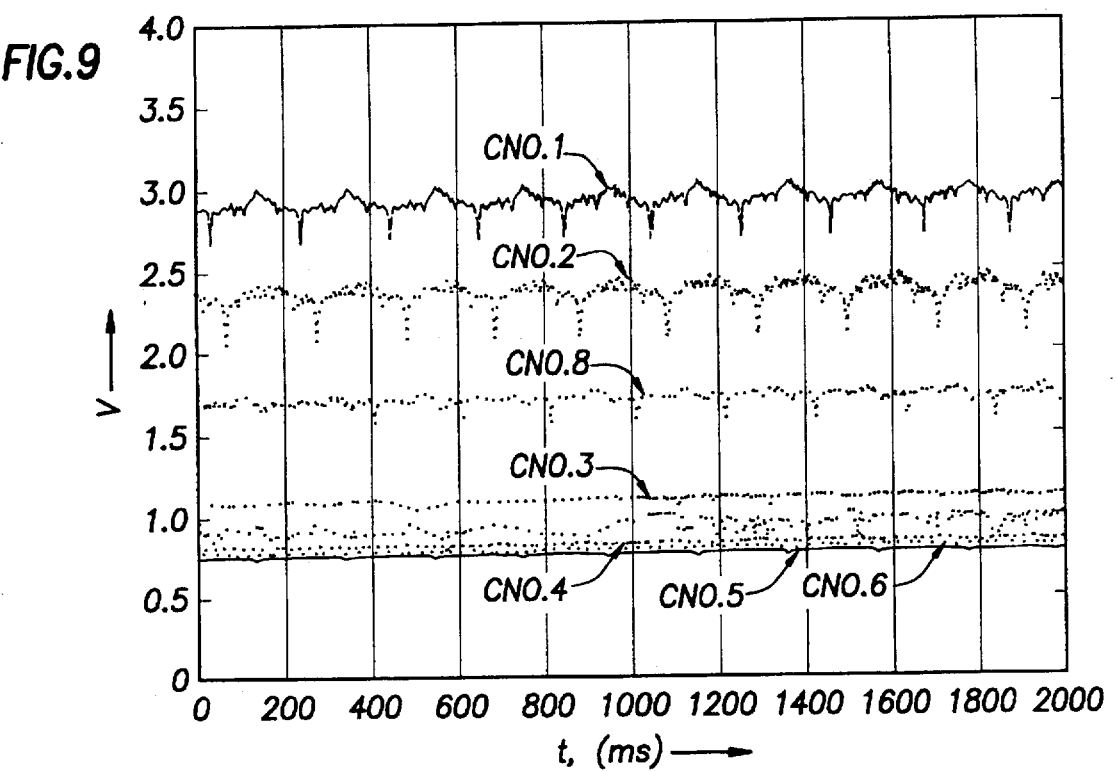
FIG. 9 is an example of readings of voltage measured during drilling of a bore by a drill bit equipped with 8 electrodes, as a function of time.

Several embodiments of the present invention may produce a family of curves such as shown in the graph of FIG. 9. The multiple curves (curves CN01 to CN08) correspond to eight electrodes.

Figure 14:
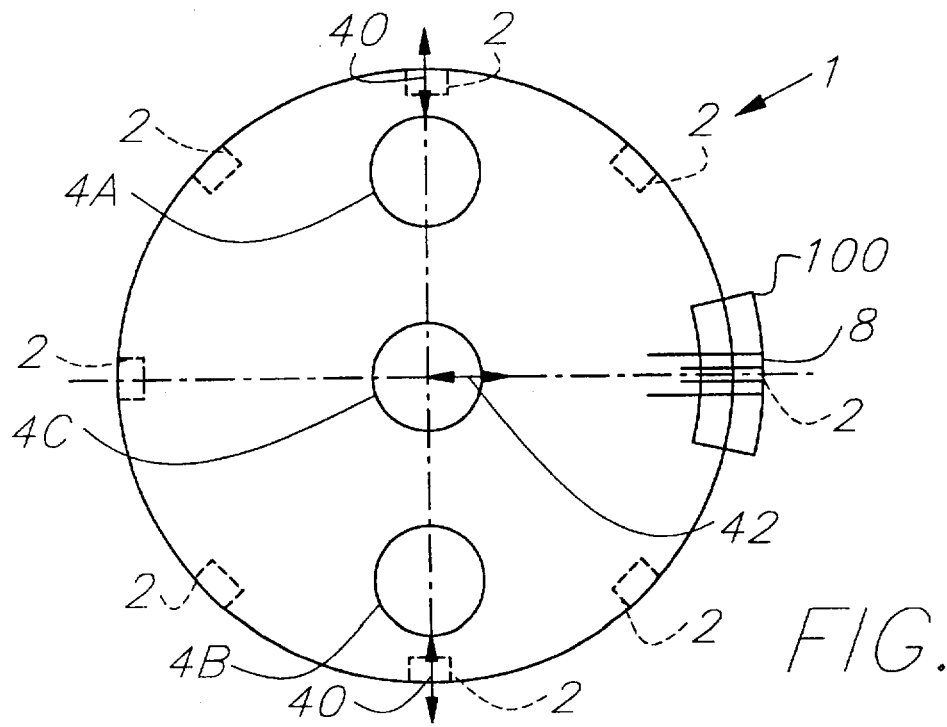
FIG. 14 is a schematic representation of a top view of a drilling head with sensor layout including an outwardly protruding sensor mounting.
Figure 15:
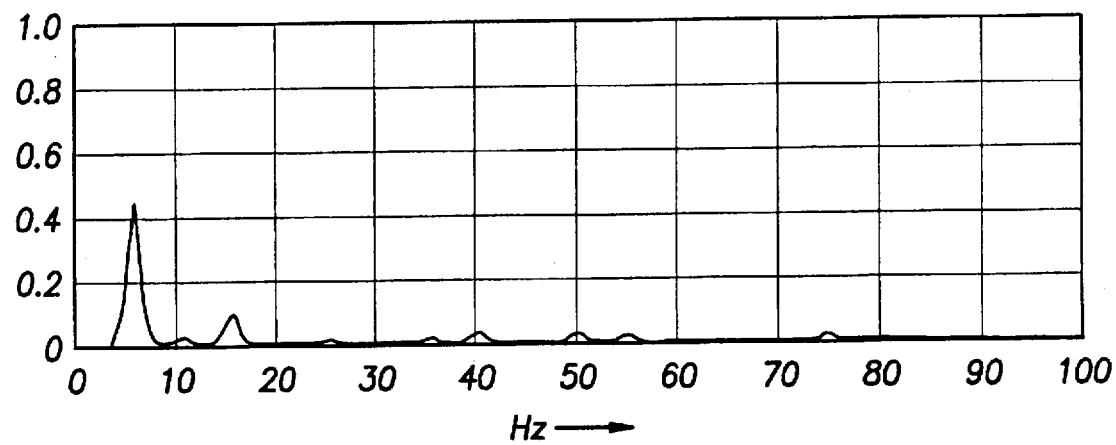
FIG. 15 is a representation of the frequency spectrum of bit movement in terms of amplitude of the bit movement versus frequency.

For instance, in the "cannon fuse" embodiment of FIG. 14, the electrode 2 is arranged within the so-called "support-pad" or pad 100 of drill bit 1. Pad 100, which may be exaggerated in the radial dimension for explanatory purposes, may be designed such that, at least in a circular wellbore, it will rest almost permanently against the side of the bore being drilled. During the action of cutting the formation by drill bit 1, pad 100 is positioned to be pushed solidly against the borehole wall by a determinable cutting force produced by the cutters. Accordingly, another electrode 2 spaced circumferentially opposite pad 100 and associated with curve CN05 is more likely to be pushed away from the wall.

Because the electrode 2 associated with pad 100 is virtually always in contact with the formation being drilled, and assuming the wellbore is circular, then the electrical resistance measured thereby will normally be of the formation rather than of the drilling fluid. Thus, CN01 is more likely to read formation resistivity and CN05 is more likely to read borehole fluid resistivity. The remaining curves are more likely to provide a reading of a substantial mixture of the two resistivities. The curves may be combined for analysis purposes to provide a reasonable approximation of true formation resistivity and borehole fluid resistivity at bit 1.

A distribution of readings, as shown in FIG. 9 by curves CN01 to CN08, such that curves CN01 to CN08 consistently provide a spectrum of readings ranging from higher to lower may also be obtained, for instance, from an electrode configuration such as that of FIG. 4 whereby all electrodes are at substantially the same radial distance from the center 43 of bit 1 along the circumference thereof. However, this requires that one electrode is consistently pressed against the borehole wall in preference to the other electrodes. This may be achieved if, for instance, the drill bit cutting section 1C of bit 1 is designed to produce a relatively consistent resultant radial force on drill bit 1 toward one electrode 2 for this purpose. Such a method or bit construction may also be consistent with producing a more stable bit as is known to those skilled in the art.

Yet another manner of producing a distribution of the curves CN01 to CN08 as shown in FIG. 9, may be obtained by mounting the circumferentially spaced electrodes 2, except for that associated with pad 1130, at somewhat less than the gauge circumference of drill bit 1. The respective electrodes 2 that provide curves CN02 and CN08 are then situated on either side of the electrode 2 which provides curve CN01. The respective electrode 2 that provides curve CN05 is circumferentially spaced so as to be almost opposite the electrode that provides curve CN01.

A distribution of readings similar to that shown in FIG. 9 may also be obtained by a method of taking samples during relatively short time durations. This method exploits the statistics of signals measured by the circumferential spacing of electrodes 2 while the hole is being drilled. If the hole size is the same as the bit gauge, then all electrodes 2 positioned at bit gauge will effectively measure an apparent formation resistivity due to contact with the formation. So long as the hole size is the same as bit gauge, there will be no direct measurement of drilling fluid resistivity. As the borehole enlarges, there will be a distribution of resistivities observed at a moment in time at each sensor. Thus, assuming that a particular electrode 2 contacts the borehole at some time during a time interval while measurements are being made with a plurality of electrodes 2, the following two cases may be distinguished:

1) $R_m < R_t$ (or $R_{xo}$ if invasion is present). In this case, the largest observed resistivity should be $R_t$ (or $R_{xo}$ if the zone of interest is flushed by invasion, or some reading between these values if the zone of interest is only partially invaded).

2) $R_m > R_t$. In this case, the smallest observed resistivity should be $R_t$.

If the borehole is so enlarged that there is no contact during the measurement time interval by any of the electrodes 2, then the measurement of formation resistivity will be in error. On the other hand, the drilling fluid resistivity will be available for this case.

However, if the apparent resistivity is monitored continually while drilling, it should always be possible to get a good measurement of $R_t$ (or $R_{xo}$) if the formation is reasonably competent so as to be substantially consolidated. As the borehole is enlarged due to bit whirling or the like, the observed resistivity distribution will become broader. Thus, changes in this distribution may signal the onset of whirling, or other potential problems such as walking by the bit off the desired drilling course. Assuming that electrode 2 is fairly close to the borehole wall and that the mud is more conductive that the formation, the observed resistance decreases faster than a linear function of the distance between electrode 2 and the borehole wall.

Looking at curve CN01 of FIG. 9, it is seen that voltage V, between electrode 2 in pad 100 and the metallic mass 7 of core bit 1, varies during drill bit rotation. This variation of voltage V depends on the degree of contact (see top and bottom of curve CN01) with the wall of the bore. In other words, it depends on the greater or lesser amount of liquid (drilling and/or formation fluids) present between the borehole wall and electrode 2. The measurements of resistance R as a function of time may be used to give the frequency of impacts of bit 1 against the lateral side of the bore at the location of electrode 2 at pad 100 to thereby provide the frequency of rotation of drill bit 1.

While the rotational speed of the drill string as measured at the surface may closely approximate the rotational speed of the bit as measured at the bit, it may often be different at a given instant in time. A comparison of those two rotation speeds provides an indication of overall drill string instability.

Figure 13:
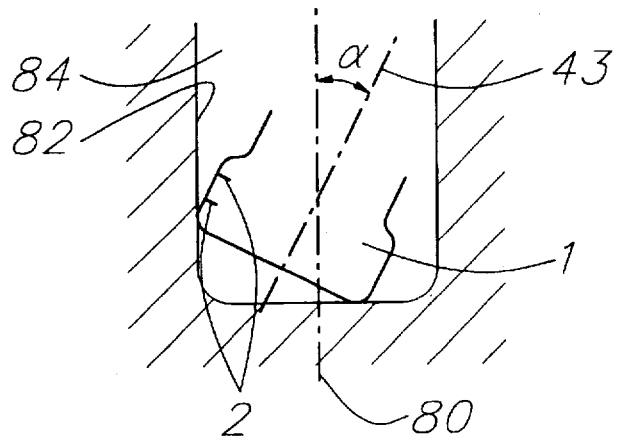
FIG. 13 is a schematic representation, in elevation, of a drill bit in which two electrodes are arranged so that their longitudinal axes are located in the same plane as the axis of the drill bit.

As shown in FIG. 13, two electrodes 2 may be vertically spaced with respect to each other along drill bit 1, preferably on a line parallel to the axis of bit 1. A resistance measurement at each of the two electrodes 2 can, after computation, give an indication of the angle of inclination a of bit 1 in relation to the lateral side 82 of the borehole 84 being drilled. This information can also be quite useful for processing to determine information such as the instantaneous direction of the drilling, the presence of "whirling", excessive weight on bit 1, instability problems, and other problems. An alternative embodiment of the present invention, with the feature of multiple sets of two electrodes vertically spaced with respect to each other, is shown in FIG. 21B and is discussed further hereinafter.

Figure 10:
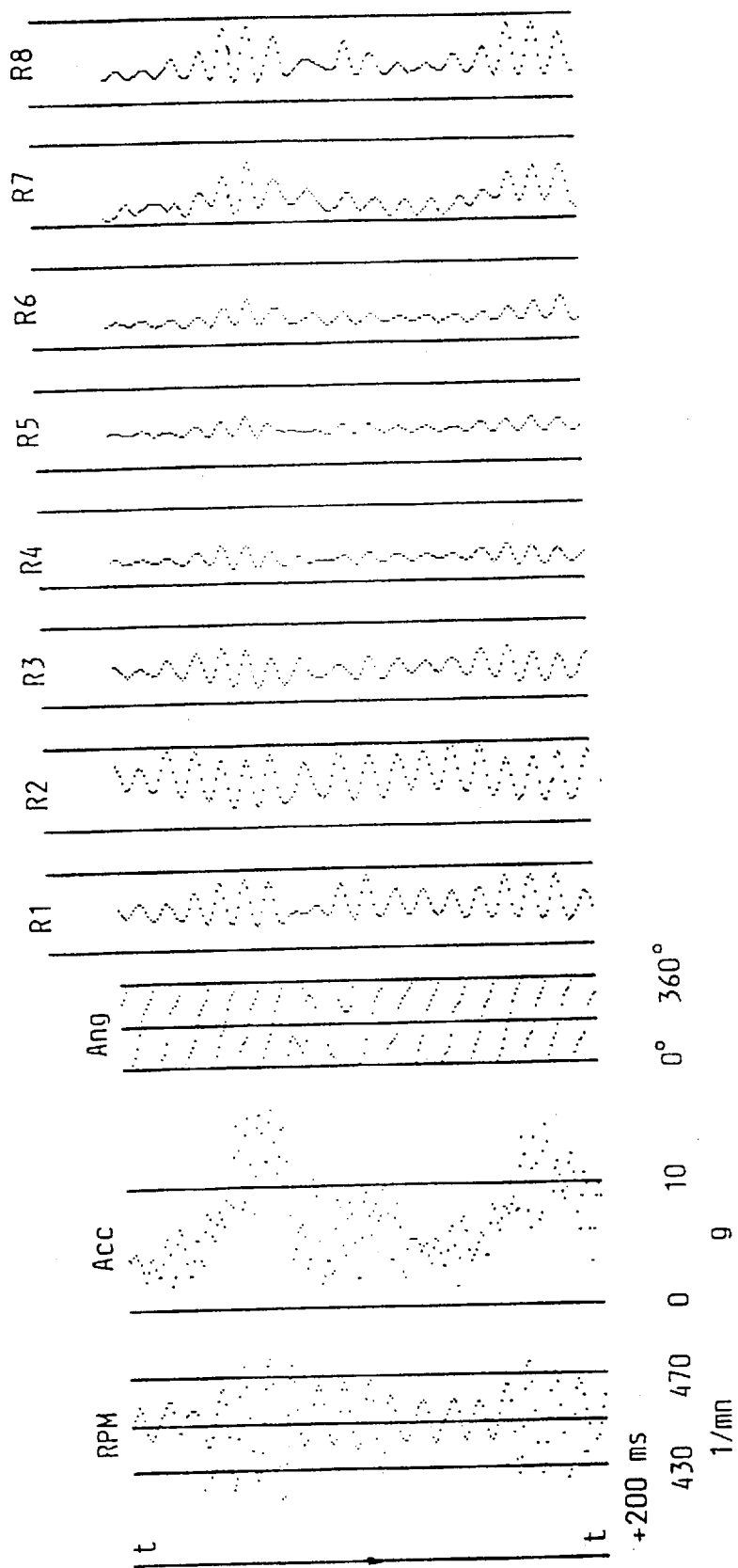
FIG. 10 is an example of readings of the simultaneous measurement of variations in the speed of rotation, accelerations, angular positions, and resistance measurements by several electrodes for a drill bit instrument, as a function of time.
Figure 11:
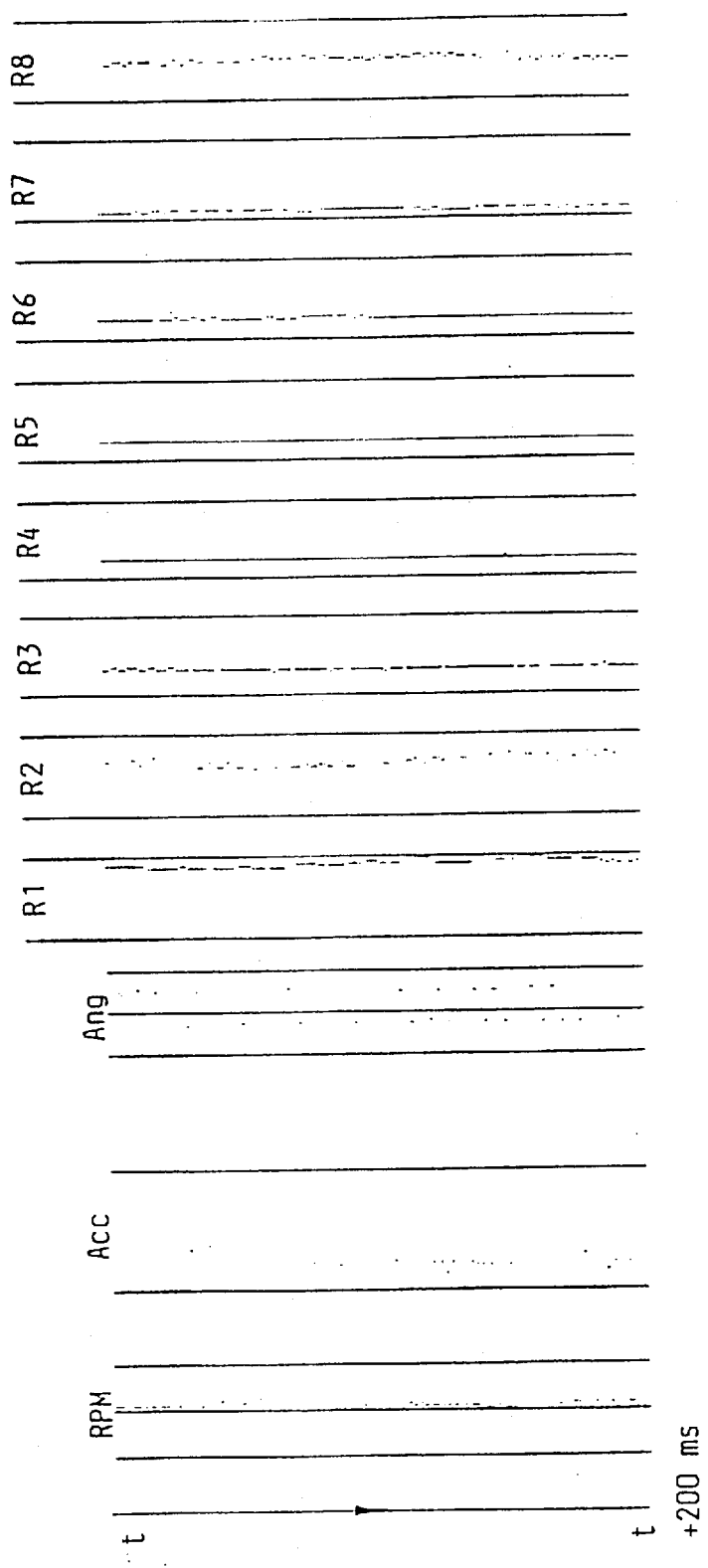
FIG. 11 is an example of readings corresponding to those of FIG. 10.
Figure 21:
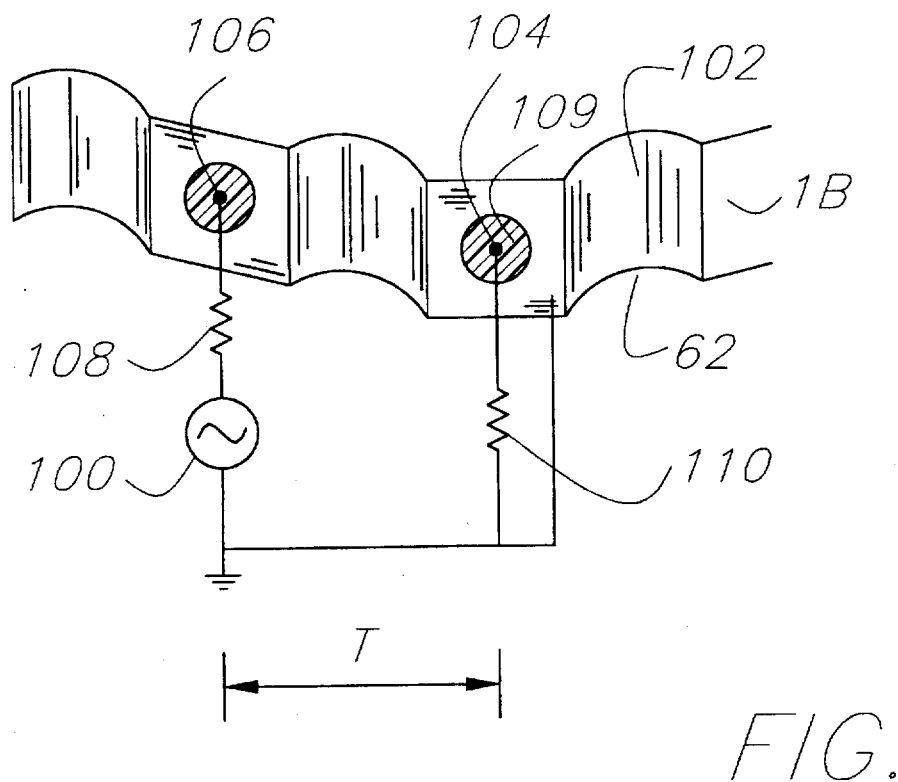
FIG. 21 is a schematic, in perspective view, of a focussed electrode configuration for a bit instrumentation.
Figure 21A:
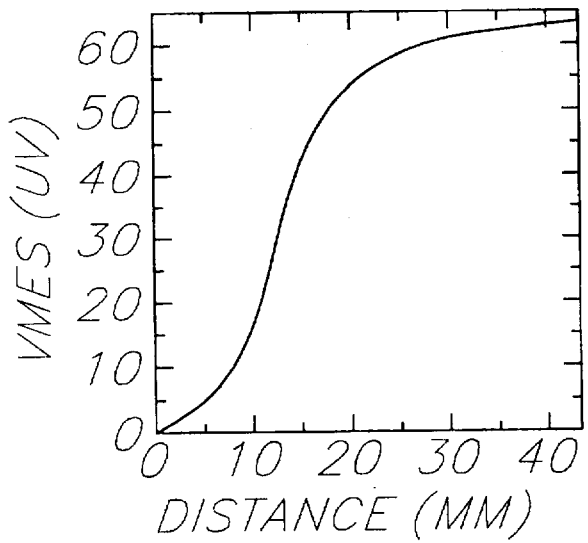
FIG. 21A is a graph derived from the electrode signal obtained with the electrode configuration of FIG. 21.
Figure 21B:
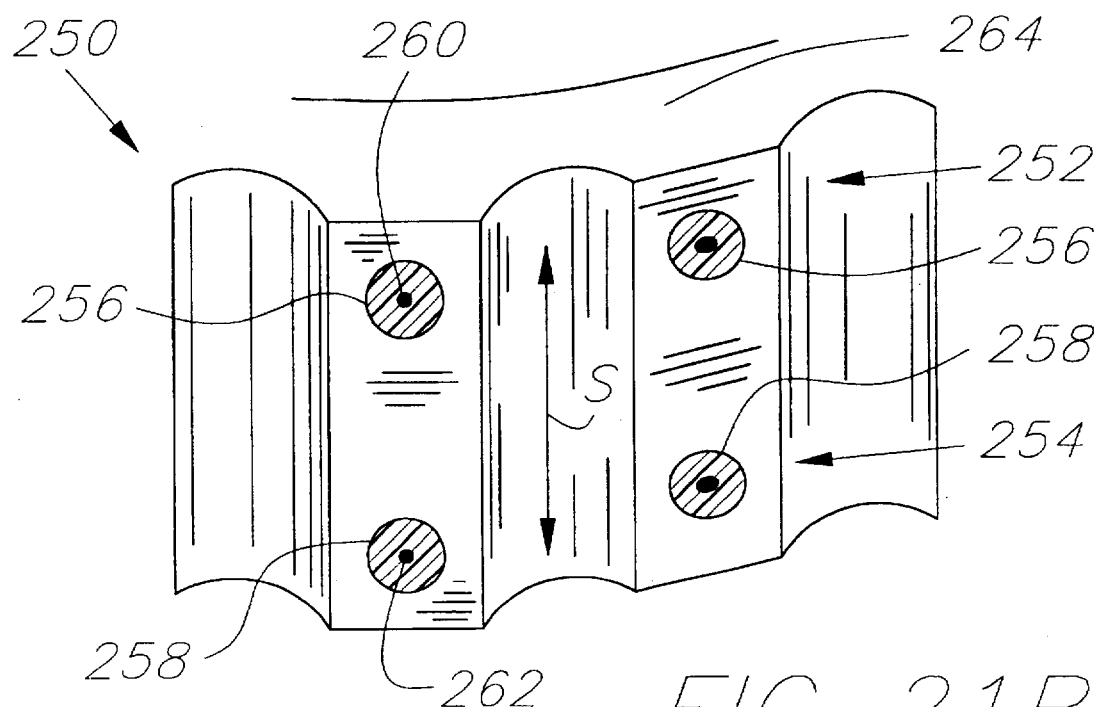
FIG. 21B is a perspective view of an a bit having two axially offset rows of circumferentially spaced electrodes.

FIGS. 10 and 11 illustrate resistance signals R1 through R8 that could be obtained from either the electrode configuration shown in FIGS. 4, 14, or 21B. The resistance signals R1 through R8 are provided as a function of time, between t and t+200 ms. The rotational speed of drill bit 1 in revolutions per minute (RPM) and the substantially instantaneous fluctuations in the rotational speed are clearly discernable.

According to another advantage of the present invention, the variations in the speed of rotation and/or the movement of bit 1 itself can also be measured with at least one accelerometer 4, as explained in detail hereinafter. The combination of the resistance and acceleration measurements thus obtained may then be used to adjust the above-mentioned drilling controls while the measurements are being taken and/or during subsequent drilling operations. Accelerometer signal ACC ranging from 0 to more than 10 G's is also provided. Accelerometer signals may be provided from accelerometer sensors in more than one direction as discussed hereinafter. The direction of vector acceleration ANG of drill bit 1 may also be provided.

If there are large fluctuations in all of these signals as shown in FIG. 10, it becomes apparent that the relevant drill or core bit 1 is acting in an instable manner that may cause rapid bit wear or damage, an increased probability of inaccurate drilling, bit walking, and other problems. FIG. 11 provides the same signals wherein the core or bit is acting in a stable manner. Thus, the signals of FIG. 11 could be obtained from a different more stable bit or could be obtained from the same bit after control measures are used to prevent instability. Thus, by adjusting the drilling in some manner as discussed hereinbefore (i.e., reducing the weight on the bit, increasing/decreasing bit rotation speed, etc.) in response to signals from the bit instrumentation of the present invention to provide a more stable signal, it is thereby possible to greatly extend the life of the bit. A computer may be used to monitor such fluctuations and signal unstable amplitudes or frequencies of operation.

For each moment of time, a treatment of the signals in FIG. 10 allows determination of the spatial position of the core bit 1 in relation to the lateral side of the bore being drill and therefore the computation of the path followed by the center of core bit 1. The trajectory of the center of core bit 1 (for example, as per FIG. 16) can be found by means of double numerical integration of the measured values of acceleration from one or several accelerometers 4.

This trajectory can also be obtained (for example, as per FIG. 12) by means of calculations performed on the distances between core bit 1 and the side of the bore being drilled, as measured simultaneously by several electrodes 2 due to the change in value of resistance caused by the change in position of electrode within the wellbore. The resistivity (or resistance R) is effectively linked to said distance by a hyperbolic function. This trajectory approximates an epicycloid following the rotation of the head 1 against the wall. The resistance reading with respect to the distance or change in distance from the borehole wall can be calibrated by testing.

Figure 12:
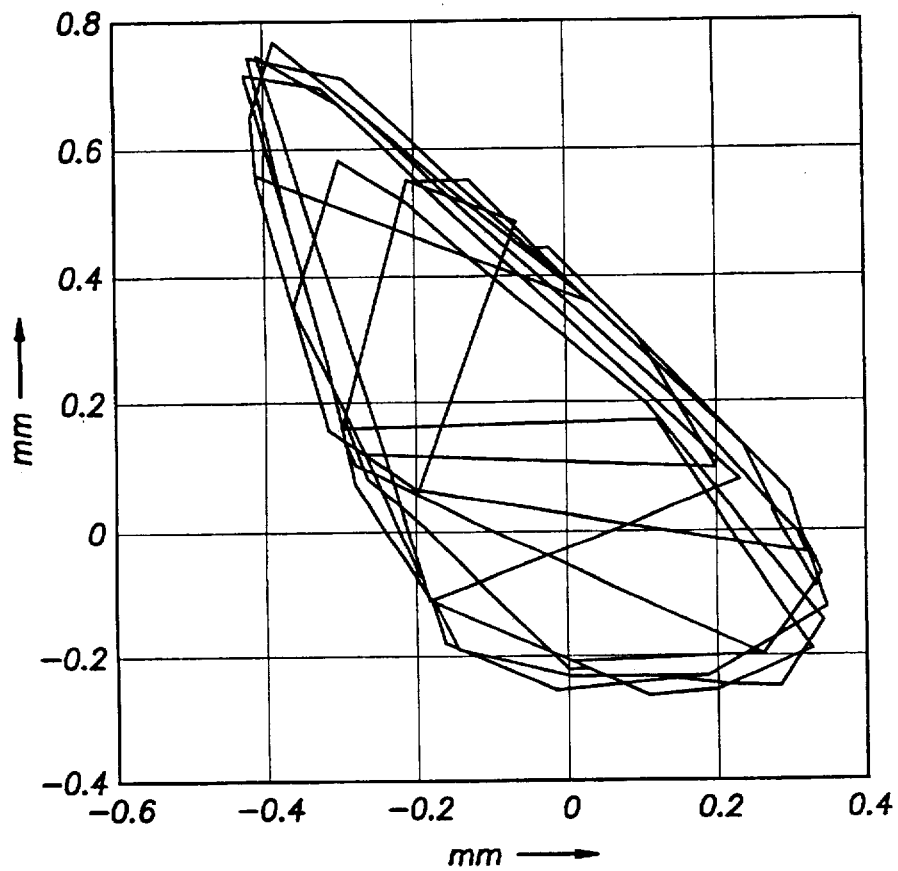
FIG. 12 represents an example of the path followed by the center of the drill bit during drilling, for a predetermined period of time, in a plane passing through the center and perpendicular to the axis of a bore drilled by the drill bit, the path being obtained from the resistance measurements such as those taken by electrodes shown in FIG. 4.
Figure 16:
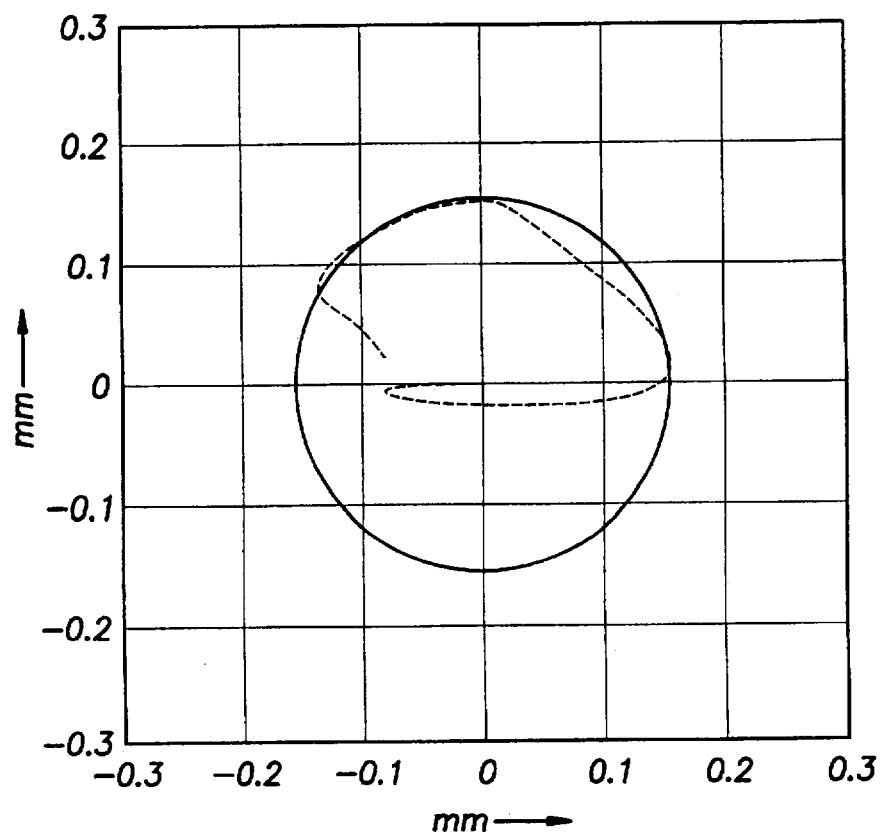
FIG. 16 illustrates a projected theoretical path (solid line) of the center of the drill bit versus an experimental path (broken line) for a period of time, and obtained by double numerical integration of the drill bit's acceleration as measured by the above-mentioned accelerometers.

Looking, for instance, at FIGS. 12 or 16, instabilities such as whirling or "walking" of the bit away from a desired drilling path may be indicated that could allow for immediate correction by varying the drilling controls such as speed or weight on the bit. For this purpose, the center of the bit may be provided and compared with the theoretical center of the borehole to determine drilling accuracy. If the bit center remains predominately on a side of the borehole that is different from the anticipated direction of the hole (as perhaps produced by drilling with a bent sub) then this may be an indication of "walking" of the bit.

See also, for instance, FIG. 13 where angle a may be determined between drill bit axis 43 and the desired borehole axis 80. If this angle is different from that which may be expected due, for instance to a bent sub, this may be an indication of drilling direction problems. As well, significant variation of this angle during drilling indicates instability.

Other uses for a configuration or plurality of circumferentially spaced electrodes may include providing formation dip analysis. The case of a non-rotating bit is discussed first. The inclination of the borehole should be known at the bit for this determination. If the azimath of the borehole and the tool face angle of the bit are known, the azimath of the intersection of the bed boundary with a horizontal plane can be determined. For purposes of this discussion, the tool face angle is the angle between the vertical plane containing the tool trajectory and an arbitrary reference line along the surface of the bit parallel the axis of symmetry of the bit 43. In directional drilling practice, the plane containing the bent sub is vertical when the tool face angle is zero.

Figure 26:
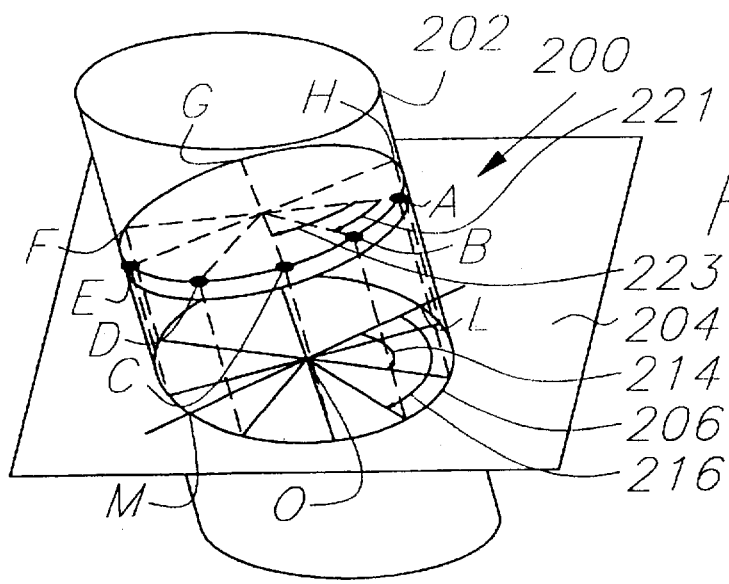
FIG. 26 is a schematic, in perspective, of a bit instrumentation for obtaining a dip log.
Figure 28:
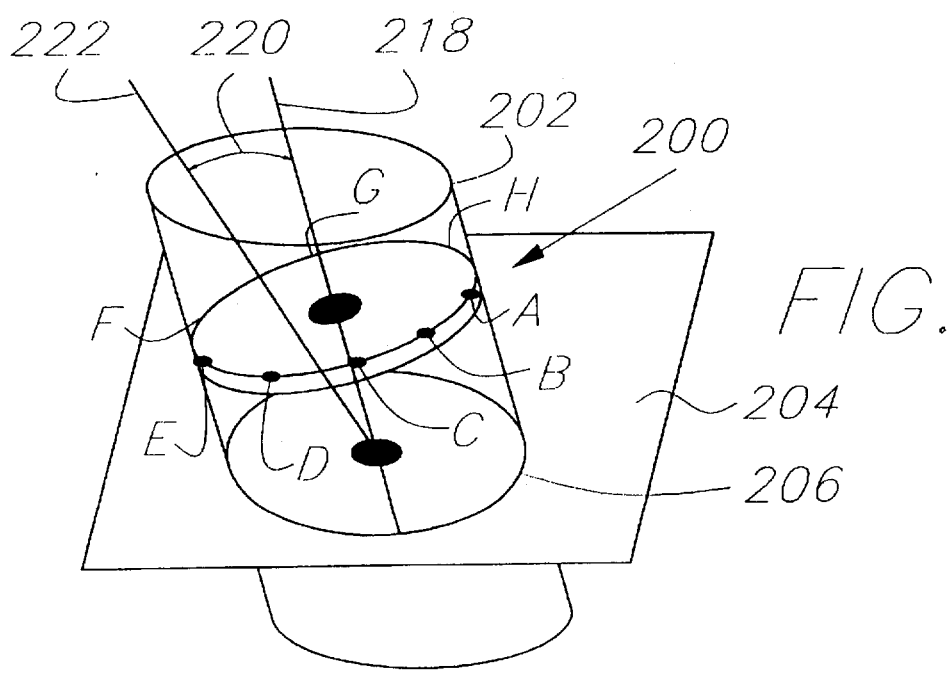
FIG. 28 is a graph of sensor signals of the bit instrumentation of FIG. 26 wherein an interface in a formation is encountered.

Referring to FIG. 26 and FIG. 28, an instrumented bit 200 is schematically depicted in a borehole 202 such that borehole axis 218 makes an arbitrary angle with respect to the vertical (vertical axis not shown). Borehole 202 intersects boundary plane 204 that is depicted to schematically indicate a relative discontinuity as between two different lithologies. Eight sensors, A–H, are disclosed that are preferably substantially uniformly distributed about bit 200. Although FIG. 26 and FIG. 28 show instrumented bit 200 as being above boundary plane 204, it will be understood that the path of the sensors through boundary plane 204 is as indicated in dash and that bit 204 may be positioned either above, below, or at the bed boundary. Thus, if bit 204 is placed at the bed boundary, then sensor A is near the highside of the borehole although other one of the other sensors could also be in this position. For a circular borehole and plane bed boundary, intersection 206 is an ellipse. Point L is the highest elevation of intersection 206 and Point M is the lowest elevation. For each sensor, A–H, there is a respective angle $\theta_A$–$\theta_H$ between line LM and a line from center O of line LM to the respective sensor. For visual reference, angle $\theta$ for sensor A and B are indicated as angle 214 and 216, respectfully, in FIG. 26 although each sensor is associated with a respective angle $\theta$.

Figure 27:
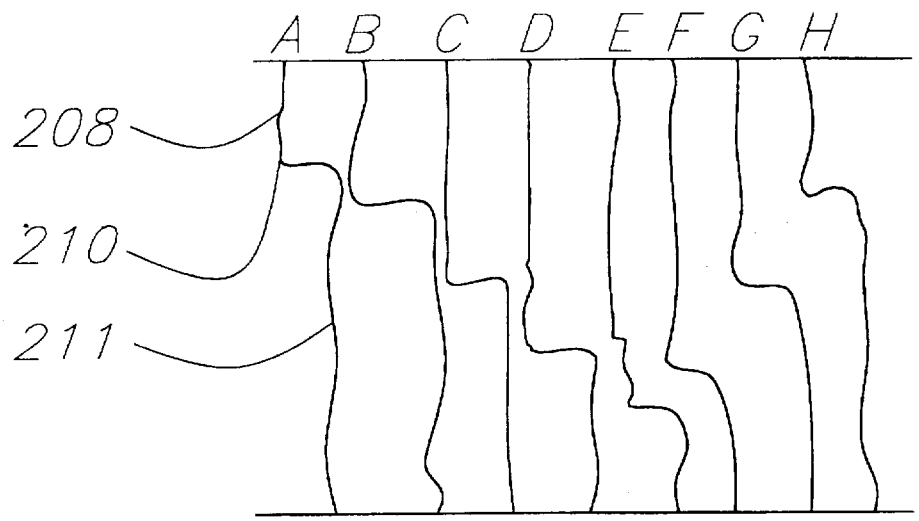
FIG. 27 is a schematic, in perspective, of the bit instrumentation of FIG. 26.

Each sensor therefore is at a different elevation related to $\theta$ that results in a log of resistivity versus depth as may be shown in FIG. 27 as bit 200 moves from above bed boundary 204 into bed boundary 204. The traces are similar but not identical. Assuming bed boundary 204 represents a higher resistivity zone with respect to the formation above bed boundary 204, then each trace shows a lower resistivity upper zone 208, a sharp transition zone 210, and a lower zone 211 indicating a higher resistivity. The transition regions are all similar in shape but occur at different depths due to factors related to the respective angle θ, the angle 220 between borehole axis 218 and line 222 that is orthogonal to bed boundary 204 as shown in FIG. 28, and the diameter of borehole 202. The respective angle θ is dependent upon angle 220 and the circumferential angle φ between each sensor such as angles 221 and 223.

A cross-correlation technique, may be used to determine the depth offset between the various transition regions 210. The equations for the depth offsets between the transition zones, along with their implicit functional dependence on their respective angle φ can be fit into a non-linear least squares equation and solved for angle 220 using a technique such as the Levenberg-Marquardt technique. If the spatial orientation is known, as from inclinometer/magnetometer measurements, the orientation of the plane can be further fixed in space. Other related techniques may also be used at least in part. See, for instance, the determination of dips from wireline resistivity sensors made using the method of U.S. Pat. No. 4,517,835, which is incorporated herein by reference.

If the bit is rotating, the problem is more complex using this type of analysis. In this case, it is best if all resistivity sensors A–H are polled simultaneously at a known time. Since it is not safe to assume that the downhole rotary speed is constant even if the surface speed is, these measurements should be correlated with measurements from a survey tool, such as a three-axis inclinometer/magnetometer packages. The readings from the survey tool can be transformed into inclinations and azimuths that can be used to rotate all of the resistivity measurements (at different apparent depths along the borehole axis) into a common coordinate frame. Once these transformations have been effected, the calculation of angle 220 can be carried out as before.

While some of the calculations can be carried out downhole, the final calculation of angle 220 must be carried out at the surface because, at present, there are no reliable ways of measuring or inferring apparent depth along borehole axis 218 or changes in the apparent depth using downhole instrumentation.

Another simpler technique can sometimes be used with a rotating bit such as bit 250 shown in FIG. 21B. Although not required for this technique, bit 250 includes two sets 252 and 254 of circumferentially spaced resistivity or contact sensors. The additional set of sensors provides a quick check of operation of this method. Each pair of sensors 256 and 258 is provided at two different depths depending on the respective set 252 or 254 they are in. Each pair of sensors, 256 and 258, is preferably provided such that their respective measuring surfaces 260 and 262, are aligned parallel to the axis of the bit. Surfaces 260 and 262 are separated by a about several inches such that distance S is preferably in the range of from about two–five inches. Surfaces 260 and 262 are preferably at the gauge diameter of bit 250.

The measurement is made by noting the time, T1, at which lower measuring surface, such as 262, first crosses the bed boundary and noting the time, T2, at which measuring surface 262 is always beneath the bed boundary. The signal will change from a varying signal to a substantially constant signal after it is completely beneath the bed boundary. If r is the radius of the bit, and if the depth at time (as noted from surface measurements) T1 is S1, and the depth at T2 is S2 then angle 220 or δ will be:

$$\delta = \tan(L/2r) \text{ where } L = S2 - S1.$$

The additional upper row of sensors 252 provides a quick check since the same signal sequence should be repeated by the upper sensors. As well, a bed boundary is immediately indicated when the lower 254 shows a change that is not seen by upper set 252 and there appears to be no other reason for the difference.

In another embodiment of the present invention, focusing electrodes are used to focus voltage flux or electric current to provide a depth of investigation that extends further outwardly from bit 1 so as to allow determination of the distance from a contact sensor on bit 1 to the borehole wall in a washed out region, or to obtain a more accurate formation resistivity less affected by the wellbore and elements therein.

FIG. 21 discloses a presently preferred embodiment for a sensor configuration having two circumferentially spaced electrodes for focused resistivity measurements. In this embodiment, the electrodes are single electrode sensors with each sensor preferably constructed substantially as sensor 5B discussed hereinbefore in conjunction with FIG. 3. A similar electrode configuration may be provided for each pair of vertically spaced electrodes as indicated in FIG. 21B.

As indicated in FIG. 21, power supply 100 generates voltage between the two insulated sensors 106 and 109. A first measurement of voltage across resistor 108 may be made to provide total current flowing through the liquid and/or formation including the focusing current. A second measurement of voltage across resistor 110, connected to current return electrode 104, provides the focused current, which is typically much less than the total current. The signal current is used in conjunction with voltage measured at insulated electrode 106 to determine the resistance seen by the electrode configuration. Thus, in the preferred configuration, a voltage is applied between sensors 106 and 104, and the resulting current across resistor 110 is measured by preferably monitoring the voltage across resistor 110.

Generally, two electrical techniques can be used for focusing electrical energy radially outwardly from bit 1 for the various sensor configurations: (1) an electric current supply is connected to the electrode, such as electrode 106, and a variable voltage across the measurement terminals, such as between electrodes 106 and 104, is detected, or (2) a voltage supply is connected to the electrode, such as electrode 106 as shown, and a variable current flow is measured, such as a by measuring voltage across resistor 110.

For the preferred embodiment of electrode configurations such as those shown in FIGS. 21–24, the voltage supply systems have been found to provide the best results and have been the easiest to implement. Electric current power supplies are somewhat more complicated since they preferably have regulation circuits to drive the main current as far as possible. Voltage focusing typically requires merely applying an identical voltage to a measuring electrode and a focusing electrode.

Electrode spacing T, the distance between electrodes such as electrodes 106 and 104, affects that depth of investigation of the sensor. Because various electrodes are available around the circumference of bit 1, different spacings T may be selected. Tests indicate that where electrode spacing T is approximately 4 centimeters, the depth of investigation easily provides usable resolution at distances of 25 millimeters. Typically, the distance of a gap or stand off that may occur during normal drilling between bit 1 and a portion of the formation will not be much greater than about 25 millimeters. Thus, this depth of investigation may be suitable for many applications as discussed hereinbefore such as detection of bit whirling, movement of bit center, or variation in borehole size.

FIG. 21A provides a graph of the electrical response of an electrode configuration of the type shown in FIG. 21 for the distance between the sensor and the bore wall in millimeters as a function of the measured voltage drop in microvolts across resistor 110. As indicated, there is a fairly dynamic range of response up to about 25 millimeters.

FIG. 21B discloses an electrode arrangement for bit 250 that includes two rings 252 and 254 of circumferentially spaced detectors. The electrode arrangement is preferably provided as part of removable potion 1B of bit 1 as are other electrode configurations discussed herein. For each sensor, such as sensor 256, there is a corresponding axially spaced sensor, such as sensor 258. Sensors 256 and 258 include a corresponding electrode, 260 and 262, respectfully, that is secured to bit 250 at gauge diameter within replaceable section 264. An axial offset S is provided of several inches that may be from about two to five inches. Sensors 256 and 258 are preferably aligned so as to be parallel with respect to the axis of bit 250. The additional ring 254 of sensors may serve many purposes. Each electrode 256 may be used in connection with another electrode, such as the corresponding axially spaced electrode 258, for focusing purposes so as to provide a deeper reading sensor. The electrodes may also be used with respect to each other to determine tilting of the bit as may be indicated by variations in readings between the sensors. This sensor arrangement may also be used to enhance readings from other electrode configurations as discussed herein.

Multiple electrodes may be used within a single sensor for focusing purposes. The geometry of the assembly of electrodes within a single cavity may be used to focus current into the formation. Preferably, the number of additional electrodes within a single cavity is kept small due to problems of fluid leakage that are more likely to occur with increasing numbers of electrodes. Various electrode configurations may be used for this purpose.

Figure 22:
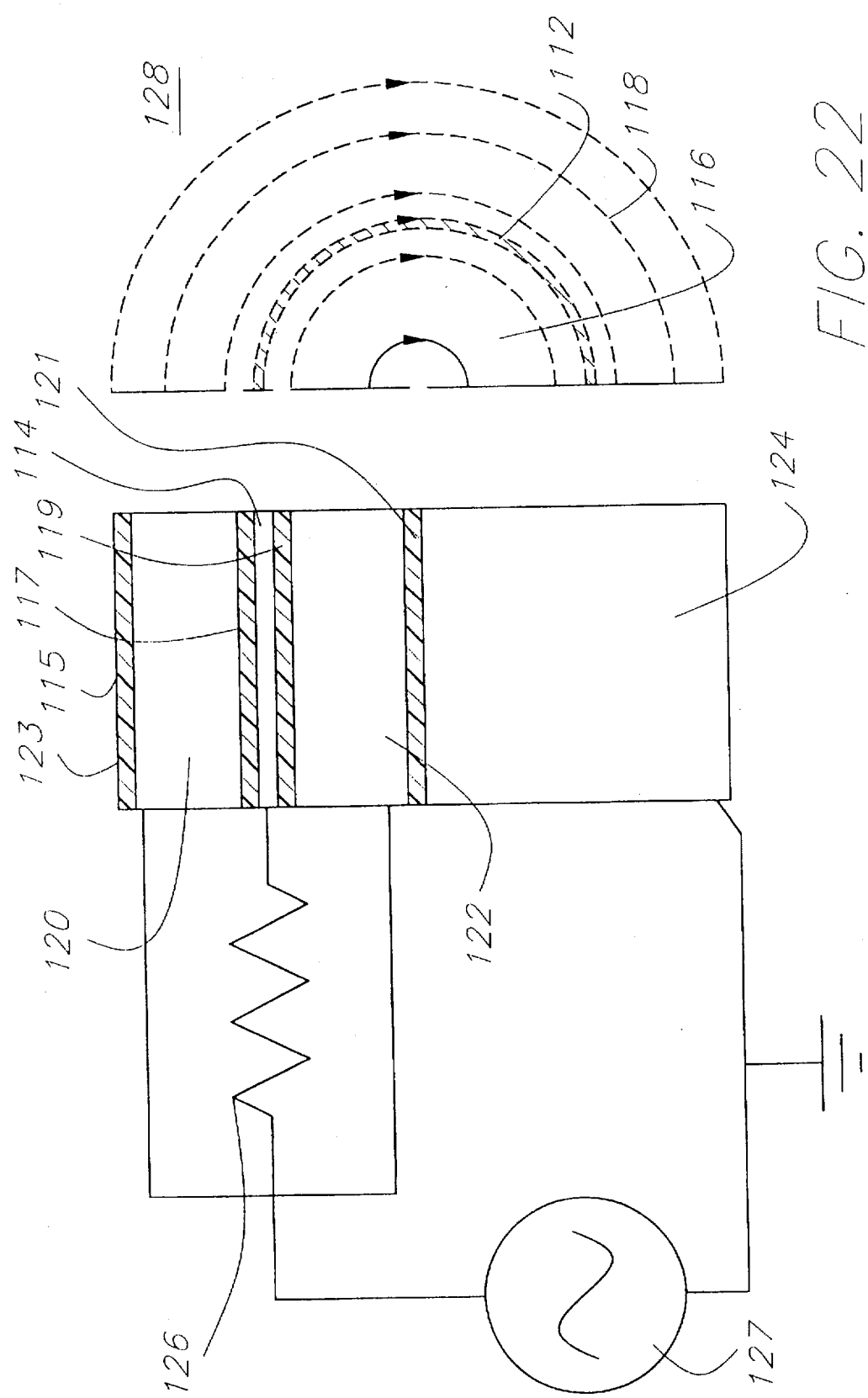
FIG. 22 is a schematic of another embodiment of a focussed electrode configuration for a bit instrumentation.

For instance, FIG. 22 discloses a focused electrode sensor that focusses measuring current 112 emitted from measuring electrode 114. Measuring current 112 is effectively sandwiched between focusing currents 116 and 118, that are emitted from focusing electrodes 120 and 122, respectively. All current supplied by power supply 126 returns to current return 124. Resistor 126 (or another current sensor such as a transformer or inductive pick-up) may be used to determine the measuring current 112. With this configuration, current may be focused more deeply through an enlarged borehole or more deeply into the formation 128. Insulators 115, 117, 119, 121 electrically insulate the electrodes from each other.

Figure 23:
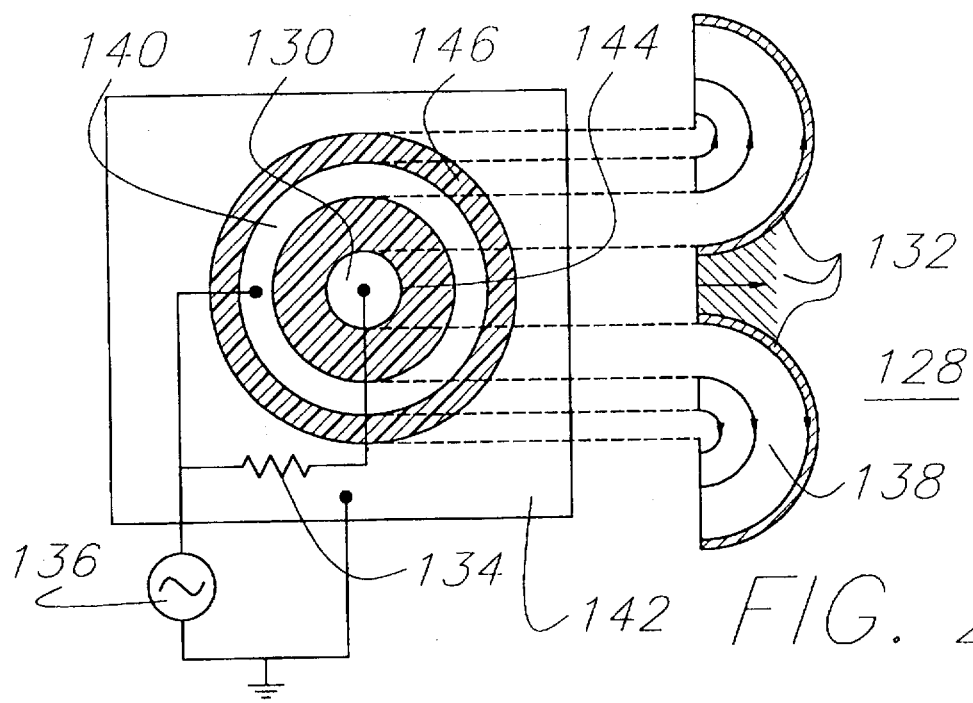
FIG. 23 is a schematic of another embodiment of a focussed electrode configuration for a bit instrumentation.
Figure 24:
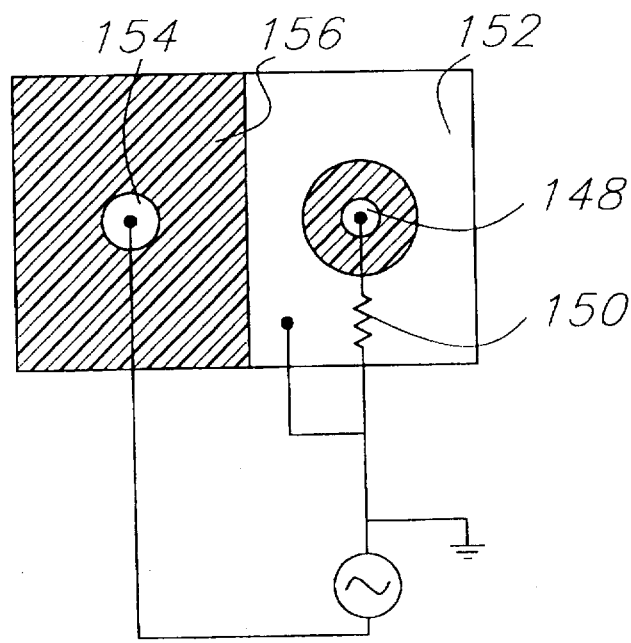
FIG. 24 is a schematic of another embodiment of a focussed electrode for a bit instrumentation.

FIG. 23 and FIG. 24 disclose similar focused electrode configurations. In FIG. 23, measuring current 132 is supplied to measuring electrode 130 through measuring resistor 134 by supply 136. Focusing current 138 from circular (or square) surrounding focusing electrode 140 focuses measuring current 132 into the borehole or formation 128. The current flows outwardly and returns to current return 142, that may be the metallic mass of bit section 1B or another portion of drill bit 1. Insulators 144 and 146 provide the necessary insulation between the electrodes.

FIG. 24 provides a measuring electrode 148 with measuring resistor 150 and focusing electrode 152 that may include bit 1 mass. The current return electrode 154 is insulated by insulator 156. Thus as before, the measuring current is forced further into the borehole and/or the formation by the focusing current.

The circuits of FIGS. 21–24 or other focusing circuits, may be used with a presently preferred 200 mV to 400 mV power supply to allow for low battery consumption but still provide a sufficiently large signal for measurement. The optimum signal frequency is that at which the liquid in the borehole behaves in a purely resistive manner. However, this optimum value depends on numerous factors such as the shape of the electrodes, resistivity of the liquid, and the like. A 4 KHz frequency may be suitable for many situations. A sinusoidal signal with a narrow bandpass to detect the measurement signal may be used to reduce noise. However, a square wave signal is easier to generate in practice and a bandpass filter at the square signal's fundamental component is useful to measure a low voltage signal in the low microvolt range.

FIG. 20 discloses a substantially unfocused system that is similar in some ways to the focused system of FIG. 19 that is discussed hereinafter. In the system of FIG. 20, current I flows from electrode A to the neutral potential at electrode N around the circumference of bit 1. Since current flows in this path, electrode V1' will be at a higher voltage potential than electrode V1 because electric current can only flow between differing voltage potentials.

In the focusing system of FIG. 19, additional current is injected or superimposed through the formation at electrode A1. The current injected at A1 may be injected simultaneously with the current flow from A to thereby raise the voltage of V1 so that it equals V1'. As well, the current injected at A1 may be injected when current flow from A is turned off in a manner referred to as digital focusing which is discussed in detail hereinafter. Because electric current flows only between differing voltage potentials, if V1 and V1' are equal, current will not flow therebetween. Therefore, current I will be focused more deeply into the borehole or the formation where a voltage gradient is available for current flow between the differing potentials of electrodes A and N.

Preferably current I is held substantially constant. Control 1 provides an instantaneous adjustment to I1 to make V1 and V1' equal as is required due to varying formation resistivity, borehole size, borehole fluid resistivity, and related factors. Control 2 provides the same function with respect to I2. Mathematical analysis of the system of FIG. 19 provides that:

$$R_a = K * V1 / I$$

where K is a tool constant and $R_a$ is the apparent formation resistivity seen by the focused system. Adjustments for factors such as borehole size, formation fluid resistivity, and the like may be used to determine the true formation resistivity. K will vary depending on tool construction factors such as bit insulation, distance between electrodes, additional unused electrodes, bit diameter, and the like. Tool insulation may be provided in recesses of bit 1 as desired to limit current flow along the bit itself. As well, shank 1A may have an insulated outer covering that does not engage the formation due to a smaller diameter of shank 1A, or perhaps have vertical insulated grooves, or the like. K may be determined most easily by calibrating the tool under controlled conditions such as in a test tank where the relevant conditions are known. Preferably, the electrodes are mounted within removable portion 1B of bit 1 and the related controls may be positioned in shank 1C of bit 1.

While a constant current source for electrode A could be used, it is preferable to use an alternating current to avoid or reduce the effects of polarization of the electrodes. The frequency of alternating current should be kept relatively low in order to avoid or reduce propagation or induction effects. For instance, a signal on the order of 1 KHz may be desirable and should preferably be less than about 10 KHz. However, the system would be operational at other higher frequencies.

For several reasons, it may be desirable to use the digital focusing method. With a digital focusing method, the main current from electrode A and the bucking current from electrode A1 are applied at different times. A significant advantage of digital focusing is that the magnitude of the bucking current need not be adjusted to focus the main current. Therefore, formations do not affect the circuits so as to drive a circuit into saturation as may occur when both the bucking current and main current are applied at the same time. For this reason, the technique is suitable for logging over a wider range of resistivities. As well, the technique is particularly suitable for a resistivity sensor for a bit instrumentation because of the severe packaging requirements imposed on such a sensor.

With digital focusing there is actually no distinction between the main and bucking current. Current is emitted from two or more sources around the circumference of the bit and measured with respect to a neutral point at two or more points around the bit. Current is first emitted from one of the sources while the other sources are off. The potential at the two or more points is measured. The first current source is turned off and a second current source is turned on. The potentials relative to the neutral point are measured again.

This procedure then allows for mathematically scaling the second current so that if the scaled current were emitted from the second current source at the same time as the first current from the first source, the potential difference across the two measuring electrodes would be zero.

For a mathematical consideration of this arrangement, let $V1'_A$ and $V1_A$ be the voltages measured at $V1'$ and $V1$ with respect to N when current I is launched from electrode A.

Let $V1'_{A1}$ and $V1_{A1}$ be the voltages measured at $V1'$ and $V1$ with respect to N when current I1 is launched from electrode A1.

Using the principle of superposition, a lateral type of measurement can be made by algebraic manipulation. When $V1=V1'$, then $I1=\alpha I$, with the focusing coefficient $\alpha$ determined as follows.

$V1 = V1_A + \alpha V1_{A1}$
$V1' = V1'_A + \alpha V1'_{A1}$
If $V1 = V1'$, then
$\alpha = (V1_A - V1'_A)/(V1'_{A1} - V1_{A1})$ Thus, $\alpha$ is known in terms of measurable quantities. Then, $$V1 = V1_A + [(V1_A - V1'_A)(V1'_{A1} - V1_{A1})]V1_{A1}$$

The apparent formation resistivity is then, $R_a = k$ (V1/I), where k is a tool constant determined by calibrating the tool under controlled conditions as in a test tank and as discussed hereinbefore.

In the preferred embodiment, V1 and V1' should be held at the same potential and V2 and V2' should be held at the same potential since the currents will then circulate around the bit. Since the electric field is not symmetrically distributed about the bit, the sensor will exhibit azimuthal sensitivity.

Another related embodiment of the system of FIG. 19 is schematically shown in FIG. 19A to provide a system that exploits the azimuthal sensitivity of this configuration. In FIG. 19A, bit 300 includes switching mechanism 302 that is indicated by an arrow of rotation. For purposes of this system, the injector terminal I, shown positioned at electrode A, is rotated, preferably in sequence, from electrode A to electrode B to electrode C and so forth back to electrode A. If desired for additional focusing, injector terminals I1 and I2, electrodes F and D, respectively, may be utilized and rotated accordingly. The receiver terminals, presently positioned at electrodes B, C, E, G, and H are also rotated. Thus, the electrode configuration of the focusing system remains constant but is oriented in a different direction with each switch to the next set of electrodes. Rotation mechanism 302 preferably rotates the system much faster than the rotation of bit 300 in borehole 304 so that the response of the system is as though bit 300 effectively not moving. The current paths, 306, 308, 310 and the corresponding mirror paths 306', 308' and 310' are substantially asymmetrical and the measurement thereof provides a mapping of the borehole cross-section, including boundaries thereof.

Note that while the circuit of FIG. 20 does not provide the type of focusing of the system of FIG. 19, it does provide a relatively longer distance between electrodes as compared with returning the current to bit 1 outer surface or an adjacent electrode that results in a focusing effect. Voltage measurements related to resistivity in the circuit of FIG. 20 may be made at electrodes V1 or V1', or between the electrodes in a differential mode, or at other circumferentially or vertically spaced electrodes rather than at electrode A, if desired.

Other multi-electrode devices may include bridge circuits and the like to make measurements that may be largely independent of drilling fluid conductivity or may provide an optimum frequency of operation such that the circuits, including the drilling fluids, act substantially in a purely resistive manner rather than as reactances. As noted hereinbefore, the measured resistivities and resistances are typically absolute values of complex impedances.

Due to the difficulty of providing watertight seals for multiple electrodes, there is a practical limit to the number of elements within a single sensor socket 3. As well, the various resistivity sensors discussed hereinbefore that have different depths of investigation may be used simultaneously within insert 1B to provide more information.

The apparatus in accordance with the present invention preferably also comprises accelerometers 4 (see FIGS. 1 and 4). Each of these accelerometers 4 can either be mono-axial, bi-axial, or tri-axial, according to whether it is sensitive to accelerations along one, two, or three mutually orthogonal directions. Thus, accelerometer 4A may be may be mono-axial and adapted to sense radial acceleration along direction 40, a radius of bit 1, passing by axis of head 1. Accelerometer 4B may be bi-axial and adapted to sense radial accelerations along direction 40 as well as accelerations tangential to direction 41. Accelerometer 4C may also be a bi-axial accelerometer adapted to sense radial accelerations of bit 1 along direction 42 and axial accelerations of head 1 along direction 43.

Accelerometers 4 are arranged on the same diameter of bit 1, perpendicular to the axis of bit 1, so that accelerometers 4A and 4B preferably lie at the same distance from axis 43 of bit 1. The accelerometer 4B may be tri-axial and measure accelerations in all three directions 40, 41, and 43 (the measurement along direction 43 need no longer be carried out by accelerometer 4C). The accelerometers 4 are preferably mounted at a position near cutting face 72 that may be below top cutter 66, as shown in FIG. 1.

Returning to FIG. 5, terminals 33B through 33J, similar to terminal 33A, are provided for other electrodes 2 distributed on bit 1. In addition, the data collection system 32 can be equipped with other input terminal 35 provide to receive signals from accelerometers 4 and it is adapted according to the type of the accelerometers used for processing the signals therefrom.

It must be understood that the invention is in no way limited to the specific presently preferred embodiments described herein and that many modifications can be made without departing from the scope of the invention. For instance, different types of connections could be used between bit sections 1A, 1B, and 1C. Pipe 74 could be threadably secured to section 1A. 1C could have male threads to secure to section 1B. Resistivity sensors or accelerometers, or other such positioned sensors could be placed on the cutting face of 1C such as at 2D or 4D. Such resistivity sensors could be fairly well protected from any damaging contact with the formation in pockets formed therein and thereby have limited or no damaging contact with the formation that might make seals difficult to maintain. Such sensors may be substantially below at least some of the cutters with respect to upper threaded connection 60 and therefore should be focused or made to read deeper into the formation in some manner such as, for instance, shown in FIGS. 19–24. The basic components of the sensors 5B that are preferably threadably secured may be removed as desired if the cutting components are discarded. Thus, sensors may be dispersed between and below cutters with respect to upper threads 60. Sensors 5B are preferably disposed within a few inches of the cutters and may preferably be within about less than 1 to 5 inches of either side of the uppermost cutters. As shown in FIG. 1, accelerometers 4 are provided at the same general depth as some cutters.

In the case of a drilling bit set up in the manner of a "cannon-fuse" as per FIG. 14, it may be possible to have only one electrode 2 situated at the level of pad 100, such that pad 100 is located substantially in the direction of the resultant of the cutting force on bit 1.

Figure 17:
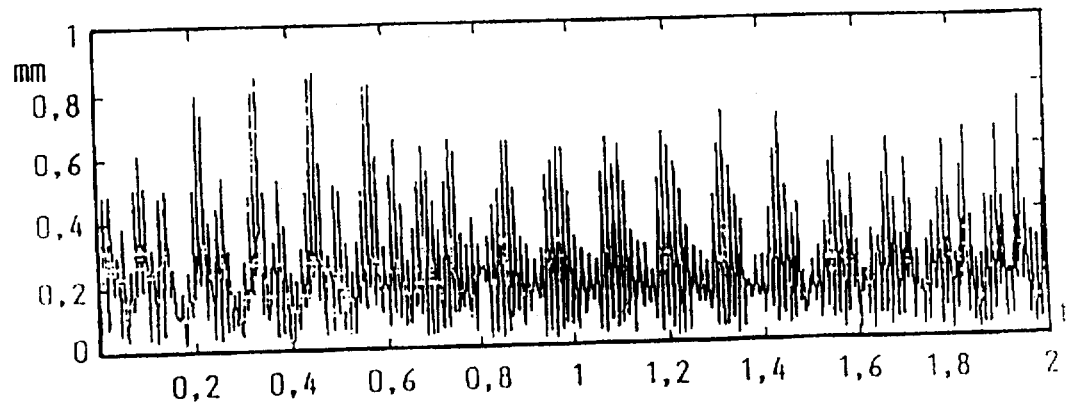
FIG. 17 is a graph derived from electrode signals in accord with the present invention as a function of time showing the development of the gap between the instant center of a bore while being drilled and the center of the drill bit.
Figure 18:
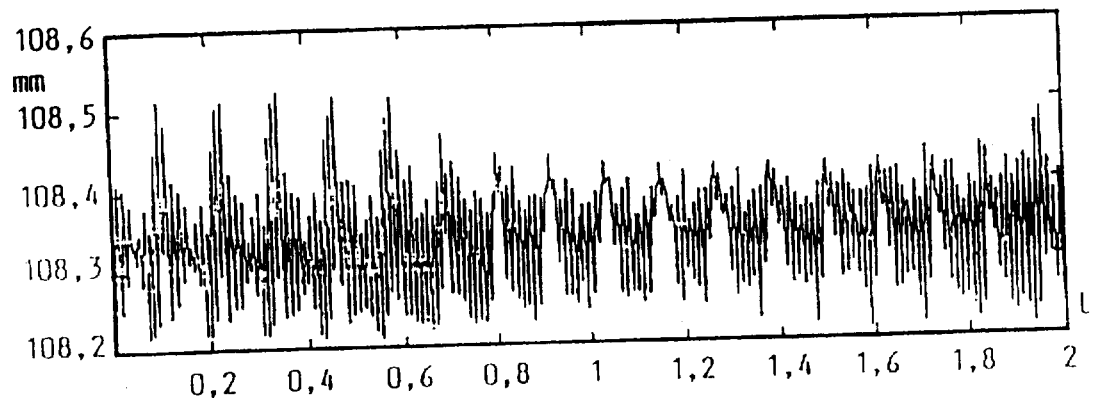
FIG. 18 is a graph derived from electrode signals in accord with the present invention as a function of time showing the development of the actual radius of the bore being drilled with a drill bit having a nominal diameter of 8½", i.e., a nominal radius of 107.9 mm.

The invention therefore offers means for measuring the resistance R of the environment where the drilling is taking place, means for measuring the various accelerations experienced by bit 1 during drilling, and means of determining the dynamic behavior of bit 1 and its position in relation to the side of the well being drilled, from which the eccentricy curves of bit 1 in relation to the well being drilled may be deduced as in FIG. 17. A measurement of the actual radius of the well being drilled can also be obtained such as shown in FIG. 18.

It will also be understood that transmitter 34 may be a known transmitter section for use with a rotary drilling rig or may transmit past a downhole motor through a downhole link to a receiver above the downhole motor that relays the signal to the surface. A two link system may also be used whereby the rotating shank 1A transmits via a first link to a receiver/transmitter below the downhole motor that is non-rotating with respect to the motor. The fixed transmitter then transmits around the downhole motor via cabling, acoustic signals, or other means.

Figure 25:
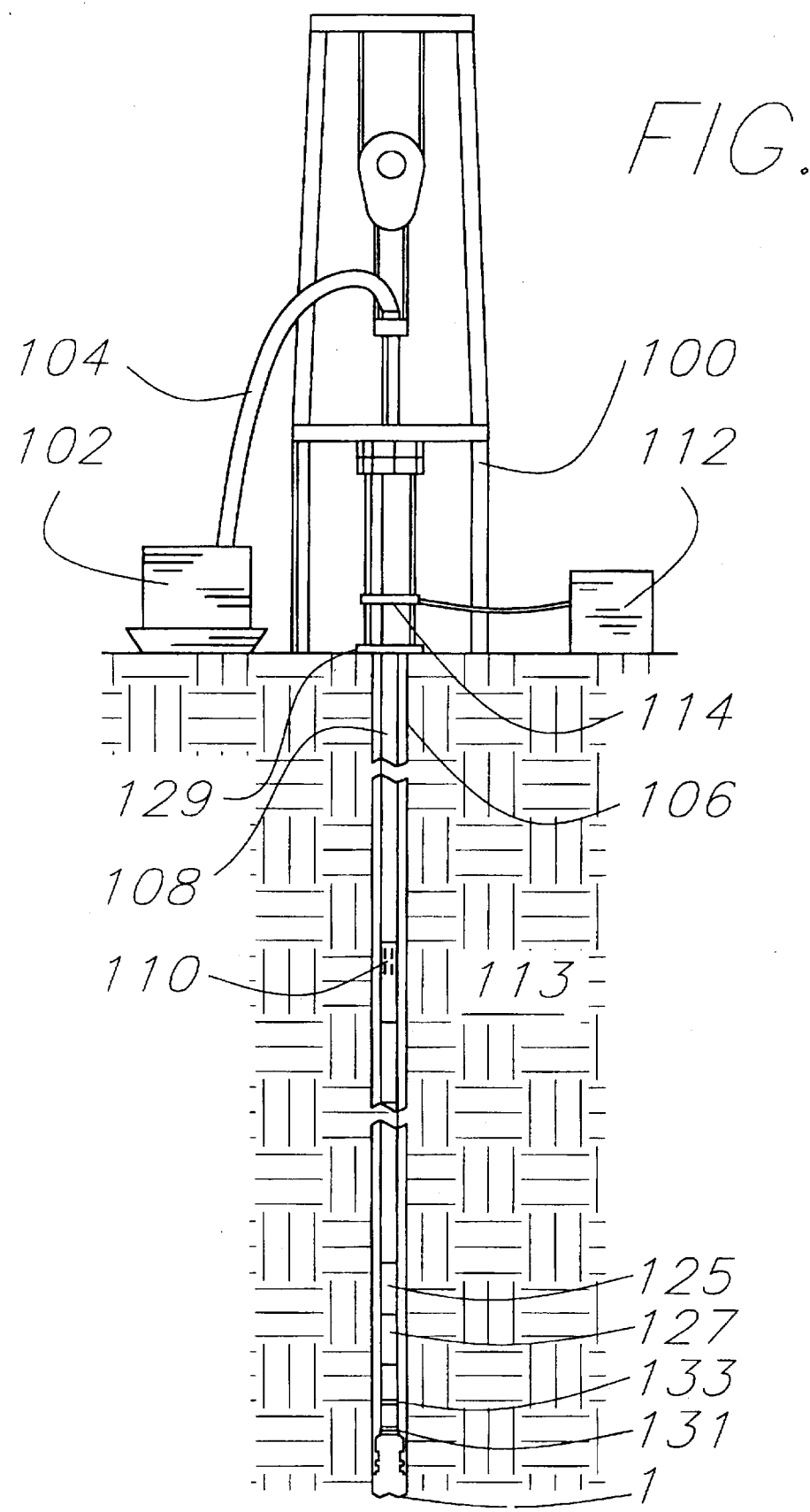
FIG. 25 is a schematic, in elevation, of a drilling rig showing the environment of operation of the present invention.

FIG. 25 discloses a general environment of operation of the present invention including drilling rig 100, mud pump 102, mud line 104, wellbore 106, drill string 108, internal bore of pipe 110, and bit 1 disposes on the end of drill string 108. The downhole assembly may include a mud transmitter 125 to transmit data from bit 1 or data may be stored within bit 1 as discussed hereinbefore.

A downhole motor 127 may be used to rotate bit 1 or a rotary drive 129 or top drive system (not shown) may alternatively/additionally be used to rotate bit 1. A bit transmitter 131 may be used to transmit data from rotating bit 1 to receiver 133, that could be non-rotating or rotationally independent or rotating at its position below downhole motor 127 as described in U.S. Pat. No. 5,410,303 which is incorporated herein by reference. Downhole motor 127 may include cabling or have other provision for transmitting past downhole motor 127, as necessary to transmit the data from bit 1 to the surface as desired.

Surface instrumentation 112 may include a computer to analyze signals that may be transmitted and received at signal receiver 114 from bit 1. Such analysis may include determining motion of bit 1 within wellbore 106 so as to determine bit stability that may indicate high bit wear or walking of the bit, bit center continuously offset to a particular side such as may indicate bit walking, bit whirling patterns including frequency analysis thereof, comparison of formation resistivities with anticipated readings, and the like. The operator may adjust the drilling as discussed hereinbefore in response to such conditions to enhance drilling.

The foregoing disclosure and description of the invention is illustrative and explanatory thereof, and it will appreciated by those skilled in the art, that various changes in the size, shape and materials as well as in the details of the illustrated construction or combinations of features of the various coring elements may be made without departing from the spirit of the invention.

What is claimed is:

1. A measuring system for a drill bit for measuring at least one physical parameter, said drill bit being secured to the end of a drill string and being operable for drilling a borehole through a formation, said drill bit having a gauge diameter, said drill string and said borehole forming a fluid flow path operable for circulating fluid through said drill string and said borehole, said apparatus comprising:

a bit body for said drill bit, said bit body having a fluid bore extending therethrough such that said fluid flow path extends through said fluid bore;

a cutter mounted to said bit body having a cutting surface at said gauge diameter for cutting into said formation to form said borehole;

a tubular shank portion extending from said bit body, said tubular shank having a top connector opposite said bit body for connecting to said drill string;

a first sensor affixed to said bit body, said first sensor being responsive for producing a first electrical signal related to said at least one physical parameter; and an electrical conductor for electrically conducting said electrical signal to a data collection system.

2. The measuring system of claim 1, wherein said first sensor is an electrical parameter sensor operable for measuring an electrical physical parameter.

3. The measuring system of claim 2, further comprising:

means for calculating radial movement of said drill bit with respect to said borehole from said electrical parameter.

4. The measuring system of claim 2, further comprising:

a computer operable for determining bit vibrational instability with respect to said borehole from a signal representative of said electrical parameter.

5. The measuring system of claim 2, further comprising:

a second electrical parameter sensor operable for measuring an electrical parameter for producing a second electrical signal related to said electrical parameter; and a computer operable for calculating drilling fluid resistivity and formation resistivity from said first and second electrical signals.

6. The measuring system of claim 2, wherein:

said electrical parameter sensor comprises an electrode with an electrode surface substantially flush with said gauge diameter of said drill bit.

7. The measuring system of claim 2, wherein:

said cutters are operable to produce a lateral force on said drill bit in response to cutting to thereby substantially continuously position a first side of said drill bit against said borehole wall, said sensor being positioned on said first side of said drill bit so as to substantially continuously engage said borehole wall.

8. The measuring system of claim 1, further comprising:

at least one uppermost cutter disposed on said bit body with respect to said top threaded connector, said bit body having a cutting face side for cuttingly engaging said formation, said first sensor being mounted within a vertically spaced range of one to five inches on either side of said at least one uppermost cutter.

9. The measuring system of claim 1, further comprising:

a second sensor comprising an accelerometer, said first sensor being responsive to electrical resistance.

10. The measuring system of claim 1, further comprising:

a cutting face for said drill bit, said first sensor being disposed along said cutting face.

11. The measuring system of claim 10, wherein:

said first sensor is operable for measuring resistance in a region below said cutting face.

12. The measuring system of claim 1, wherein said first sensor further comprises:

at least two electrodes, said at least two electrodes being insulated from each other and from said bit body.

13. The measuring system of claim 12, wherein at least one of said at least two electrodes is a focusing electrode.

14. The measuring system of claim 12, further comprising:

a voltage supply, said voltage supply being operable to apply a voltage to at least one of said at least two electrodes, and a current indicator for determining current flow from at least one of said two electrodes.

15. The measuring system of claim 12, wherein said two electrodes are circumferentially spaced with respect to each other.

16. The measuring system of claim 12, further comprising:

a plurality of circumferentially spaced electrodes, said electrodes including two current electrodes for focussing.

17. The measuring system of claim 16, wherein:

said two electrodes are turned on alternately for digital focusing.

18. The measuring system of claim 1, further comprising:

a first plurality of circumferentially spaced electrical parameter sensors.

19. The measuring system of claim 18, wherein:

each of said first plurality of circumferentially spaced electrical parameter sensors includes a focusing electrode for focusing electrical energy away from said bit.

20. The measuring system of claim 18, further comprising:

a second plurality of circumferentially spaced electrical parameter sensors, said second plurality of circumferentially spaced parameters being axially spaced from said first plurality of circumferentially spaced electrical sensors.

21. A measuring system for a drill bit operable for measuring an electrical parameter, said drill bit being disposed on the bottom of a drill string for drilling a borehole through a formation, said drill string and said borehole forming a fluid flow path operable for circulating fluid through said drill string and said borehole, said apparatus comprising:

a bit body for said drill bit, said bit body having a fluid bore extending therethrough such that said fluid flow path extends through said fluid bore therein;

said bit body having a cutting face, said cutting face including a cutter mounted to said bit body for cutting into said formation to form said borehole;

a tubular shank portion extending from said bit body and terminating with a top connector opposite said bit body for connecting to said drill string;

a first electrical parameter sensor secured to said drill bit within a first sensor mount, said first electrical parameter sensor being comprised of an electrically conductive portion;

a first insulator secured within said first sensor mount so as to be in surrounding relationship to said first electrical parameter sensor, said first insulator being operable to electrically insulate said first electrical parameter sensor from said drill bit; and an electrical conductor for supplying electrical power to said first electrical parameter sensor.

22. The measuring system of claim 21, further comprising:

an electrically conductive current return surface on said bit body.

23. The measuring system of claim 21, further comprising:

a computer operable for calculating movement of said drill bit within said borehole from said electrical parameter.

24. The measuring system of claim 21, further comprising:

a computer operable for calculating unstable bit movement from said electrical parameter.

25. The measuring system of claim 21, further comprising:

a second electrical parameter sensor affixed to a second sensor mount disposed in said bit body, said second electrical parameter sensor being comprised of an electrically conductive portion.

26. The measuring system of claim 25, wherein:

said second electrical parameter sensor is vertically spaced from said first electrical parameter sensor with respect to a drill bit axis; and a sensor reading signal processor to compare readings from said first and second electrical parameter sensors to determine tilting of said drill bit.

27. The measuring system of claim 25, wherein:

said second electrical parameter sensor is circumferentially spaced from said first electrical parameter sensor.

28. The measuring system of claim 21, wherein said first electrical parameter sensor further comprises:

at least two electrodes insulated with respect to said bit body.

29. The measuring system of claim 21, further comprising:

at least one focusing electrode for focusing electrical energy emitted from said first electrical parameter sensor radially outwardly from said bit.

30. The measuring system of claim 29, further comprising:

a voltage supply for applying a voltage to said focusing electrode with said electrical conductor.

31. The measuring system of claim 30, further comprising:
a sense resistor for measuring a measuring current related to said electrical parameter.

32. The measuring system of claim 21, further comprising:
a plurality of electrical parameter sensors, each of said electrical parameter sensors having a focusing electrode for focusing electrical energy radially outwardly from said bit body.

33. The measuring system of claim 21, wherein:
said first electrical parameter sensor is disposed on said cutting face.

34. The measuring system of claim 21, further comprising:
a plurality of electrical parameter sensors disposed at a bit gauge position on said bit body to sense said electrical parameter.

35. The measuring system of claim 21, wherein said electrical conductor impresses 400 millivolts or less on an outer surface of said first electrical parameter sensor.

36. The measuring system of claim 21, further comprising:
a plurality of electrical parameter sensors, and
means for comparing output signals from said plurality of sensors to provide a dip of a formation.

37. The measuring system of claim 21, further comprising:
a plurality of electrical parameter sensors, and
at least two current producing focusing electrodes circumferentially spaced from each other and switchable on and off.

38. The measuring system of claim 21, further comprising:
a plurality of circumferentially spaced electrical parameter sensors, each of said plurality of electrical parameter sensors being switchable to produce a current, each of said plurality of electrical parameter sensors being switched on in and off in a circumferential sequence around said bit.

39. The measuring system of claim 21, further comprising:
a plurality of fasteners for fastening said tubular shank portion to said bit body, said tubular shank portion defining therein an annular instrument housing; and
a data collection system mounted within said instrument housing, said instrument housing and said bit body defining a sealed passageway extending between said first electrical parameter sensor to said data collection system for said electrical conductor.

40. The measuring system of claim 21, further comprising:
a transmitter for said bit operable for transmitting data during rotation of said bit;
a receiver for said data operable for receiving said data, said receiver being mounted so as to be rotationally independent of said bit.

41. The measuring system of claim 21, further comprising:
a conical portion of said first electrical parameter sensor; and
a mating conical inner portion of said first insulator.

42. The measuring system of claim 21, further comprising:
an accelerometer affixed to said bit body.

43. A measuring system for a drill bit for measuring a parameter related to movement of at least a portion said drill bit, said drill bit being secured to the end of a drill string and being operable for drilling a borehole through a formation, said drill string and said borehole forming a fluid flow path for circulating fluid through said drill string and said borehole, said apparatus comprising:
a bit body for said drill bit, said bit body having a fluid bore extending therethrough such that said fluid flow path extends through said fluid bore;
a sensor mount affixed to said bit body;
a cutter mounted to said bit body for cutting into said formation to form said borehole;
a tubular shank portion of said drill bit, said tubular shank portion having a top connector for connecting to said drill string;
a movement sensor affixed to said sensor mount, said movement sensor being responsive to a parameter related to movement of at least a portion of said drill bit for producing an electrical signal;
an electrical conductor for electrically conducting said electrical sensor signal; and
a data collection system operable for receiving said electrical sensor signal.

44. The measuring system of claim 43, wherein said movement sensor is responsive to an electrical resistivity around said bit body.

45. The measuring system of claim 43, wherein:
said movement sensor is affixed along a radius of said drill bit and is oriented to sense radial accelerations along said radius.

46. The measuring system of claim 43, wherein:
said movement sensor is oriented to sense axial accelerations, with respect to an axis of said drill bit.

47. The measuring system of claim 43, wherein:
said movement sensor is mounted to sense tangential accelerations with respect to a radius said drill bit, said movement sensor being mounted at a position on said drill bit offset from an axis of said drill bit.

48. The measuring system of claim 43, wherein:
said movement sensor is operable to measure acceleration in at least two directions orthogonal to each other, said movement sensor being mounted to measure acceleration in at least one direction along a radius of said drill bit.

49. The measuring system of claim 43, wherein said movement sensor further comprises:
at least two electrodes electrically insulated from said bit body.

50. The measuring system of claim 49, wherein one of said at least two electrodes is a focusing electrode for focussing electrical energy radially outwardly from said bit body.

51. A method for making a measuring system for a drill bit, said drill bit being securable to the end of a drill string for drilling a borehole through a formation, said drill string having a bore therethrough operable for pumping fluid through said drill string and said borehole, said method comprising the steps of:
providing a bit body for said drill bit;
attaching a cutting element to said drill bit body operable for cutting into said formation to form said borehole;
securing a tubular shank portion of said drill bit to said drill bit body;

providing a connector for connecting said shank portion and said bit body to said drill string;

forming a fluid flow path through said drill bit;

providing a removable portion of said bit body;

mounting a sensor within said removable portion responsive to a physical parameter for producing a sensor signal; and connecting a signal cable to said sensor operable for transmitting said sensor signal.

52. The method of claim 51, further comprising:

electrically insulating said sensor from said removable portion of said bit body.

53. The method of claim 51, further comprising:

beveling a portion of an electrical insulator; and inserting said insulator into a beveled socket in said removable portion.

54. The method of claim 51, further comprising:

providing a plurality of circumferentially spaced sensors within said removable portion of said bit body.

55. The method of claim 51, further comprising:

providing focusing electrodes within said removable portion of said bit body.

56. The method of claim 51, further comprising:

mounting said sensor at a position in said removable portion radially offset from an axis of said drill bit; and orienting said sensor to sense acceleration along a radius of said bit body.

57. The method of claim 51, further comprising:

mounting said accelerometer at a position in said removable portion along an axis of said drill bit.

58. The method of claim 57, further comprising:

interconnecting said removable portion to said shank portion with at least two fasteners.

59. A method for measurement for a drill bit instrumentation, said drill bit having a cutter mounted thereon for drilling a borehole through a formation, said drill string and said borehole forming a fluid flow path, said method comprising the steps of:

providing a sensor to said drill bit;

threadably connecting a tubular shank portion of said drill bit to the end of said drill string, said threaded connector of said tubular shank portion encircling said fluid flow path;

selectively rotating said drill bit to drill said borehole through said formation;

detecting at least one physical parameter;

producing an electrical signal in response to said step of detecting; and conducting said electrical signal through a cable to a data collection system.

60. The method of claim 59, wherein said step of detecting further comprises:

detecting an electrical property of material around said drill bit for said at least one physical parameter.

61. The method of claim 60, further comprising:

determining an apparent formation resistivity from said electrical property.

62. The method of claim 60, further comprising:

determining drilling fluid resistivity from said electrical property.

63. The method of claim 60, further comprising:

determining rotational speed of said drill bit from said electrical property.

64. The method of claim 60, further comprising:

determining variations in rotational speed of said drill bit from said electrical property.

65. The method of claim 60, further comprising:

determining lateral movement of said drill bit from said electrical property.

66. The method of claim 60, further comprising:

determining a borehole caliper of said drill bit from said electrical property.

67. The method of claim 60, further comprising:

detecting unstable operation of said drill bit associated with high drill bit wear from said electrical property.

68. The method of claim 60, further comprising:

determining a frequency of impact of said drill bit against the side of said borehole from said detected electrical property.

69. The method of claim 60, wherein said step of detecting further comprises:

detecting a plurality of electrical resistances at spaced positions on said drill bit.

70. The method of claim 69, further comprising:

determining an apparent formation resistivity from a distribution formed by said plurality of electrical resistances.

71. The method of claim 69, determining a dip of said formation from said plurality of electrical resistances.

72. The method of claim 69, further comprising:

determining an offset of the bit axis with respect to a desired borehole axis; and controlling drilling to reduce said offset.

73. The method of claim 69, further comprising:

detecting acceleration of said drill bit.

74. The method of claim 69, further comprising:

determining an approximate diameter of said borehole from said detected acceleration.

75. The method of claim 69, further comprising:

determining motion of said drill bit from said detected acceleration.

76. The method of claim 69, further comprising:

detecting resistance at vertically spaced positions on said drill bit, determining tilt of said drill bit; and controlling drilling to reduce said tilt of said drill bit.

77. The method of claim 59, further comprising:

focusing said electrical energy outwardly from said drill bit with a focusing electrode.

78. The method of claim 77, further comprising:

focusing said electrical energy in front of a cutting face of said drill bit.

79. The method of claim 59, further comprising:

storing a plurality of signals in said data collection system;

retrieving said bit; and retrieving said plurality of stored signals.

80. The method of claim 59, further comprising:

transmitting data from said bit while said bit is rotating to a rotationally independently mounted receiver member disposed below a mud motor.

* * * * *